(12) United States Patent
Shareef et al.

(10) Patent No.: US 11,662,237 B2
(45) Date of Patent: May 30, 2023

(54) MEMS CORIOLIS GAS FLOW CONTROLLER

(71) Applicant: LAM RESEARCH CORPORATION, Fremont, CA (US)

(72) Inventors: Iqbal A. Shareef, Fremont, CA (US); Dennis Smith, San Jose, CA (US); John E. Daugherty, Fremont, CA (US)

(73) Assignee: LAM RESEARCH CORPORATION, Fremont, CA (US)

( * ) Notice: Subject to any disclaimer, the term of this patent is extended or adjusted under 35 U.S.C. 154(b) by 125 days.

(21) Appl. No.: 17/043,182

(22) PCT Filed: Apr. 2, 2019

(86) PCT No.: PCT/US2019/025389
§ 371 (c)(1),
(2) Date: Sep. 29, 2020

(87) PCT Pub. No.: WO2019/195292
PCT Pub. Date: Oct. 10, 2019

(65) Prior Publication Data
US 2021/0140807 A1 May 13, 2021

Related U.S. Application Data

(60) Provisional application No. 62/673,382, filed on May 18, 2018, provisional application No. 62/652,019, filed on Apr. 3, 2018.

(51) Int. Cl.
*G01F 1/84* (2006.01)
*G01F 15/00* (2006.01)
*G01F 1/48* (2006.01)

(52) U.S. Cl.
CPC ............. *G01F 1/8445* (2013.01); *G01F 1/48* (2013.01); *G01F 1/845* (2013.01); *G01F 1/8427* (2013.01); *G01F 1/8431* (2013.01); *G01F 15/005* (2013.01)

(58) Field of Classification Search
CPC ...... G01F 1/8431; G01F 1/844; G01F 1/8455; G01F 1/845
See application file for complete search history.

(56) References Cited

U.S. PATENT DOCUMENTS 7,540,469 B1 * 6/2009 Okandan ............. F16K 99/0001
138/40
10,627,277 B2 * 4/2020 Lotters ................... G01F 1/849
(Continued)

FOREIGN PATENT DOCUMENTS

WO WO-2004055855 A2 7/2004

OTHER PUBLICATIONS

Haneveld et al. "Micro-MEMS Coriolis flow sensor with Integrated Capacitive Readout", J. Haneveld, T. S. J. Lammerink, M. J. de Boer and R. J. Wiegerink, 978-1-4244-2978-3/09 I.E.E.E. Transactions of Industrial Electronics (2009).
(Continued)

*Primary Examiner* — Erika J. Villaluna

(57) ABSTRACT

A fluid delivery system includes N first valves. Inlets of the N first valves are fluidly connected to N gas sources, respectively, where N is an integer greater than zero. N mass flow controllers include a microelectromechanical (MEMS) Coriolis flow sensor having an inlet in fluid communication with an outlet of a corresponding one of the N first valves. A second valve has an inlet in fluid communication with an outlet of the MEMS Coriolis flow sensor and an outlet supplying fluid to treat a substrate arranged in a processing chamber. A controller in communication with the MEMS Coriolis flow sensor is configured to determine at least one
(Continued)

of a mass flow rate and a density of fluid flowing through the MEMS Coriolis flow sensor.

17 Claims, 21 Drawing Sheets

(56) References Cited

U.S. PATENT DOCUMENTS

| | | | |
|---|---|---|---|
| 2001/0032668 A1* | 10/2001 | Doty | G05D 11/138 |
| | | | 137/93 |
| 2003/0212507 A1 | 11/2003 | Wei et al. | |
| 2009/0266139 A1 | 10/2009 | Gregor et al. | |
| 2010/0037706 A1 | 2/2010 | Sparks et al. | |
| 2014/0299204 A1 | 10/2014 | Somani | |
| 2017/0010625 A1* | 1/2017 | Monkowski | G05D 7/0635 |
| 2018/0348033 A1* | 12/2018 | Reith | G01F 1/849 |

OTHER PUBLICATIONS

Sparks et al. "Coriolis Flow, Density and Temperature Sensing with a Single Vacuum Sealed MEMS Chip", D. Sparks, R. Smith, S. Massoud-Ansari, and N. Najafi, Solid-State Sensor, Actuator and Microsystems Workshop (2004).

International Search Report and Written Opinion of the ISA issued in PCT/US2019/025329, dated Jul. 16, 2019; ISA/KR.

* cited by examiner

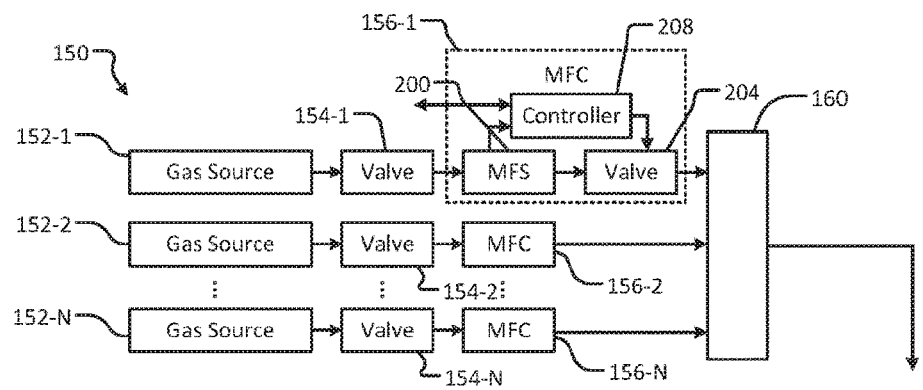
FIG. 2A
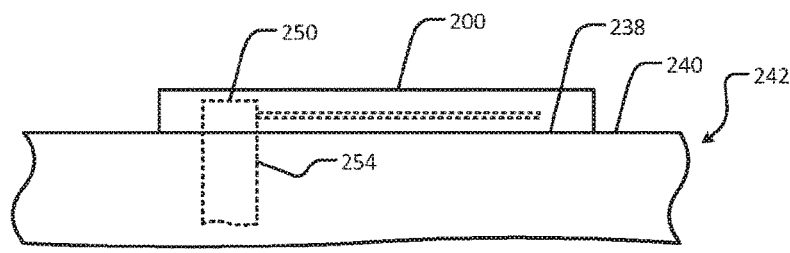
FIG. 2B
FIG. 2C
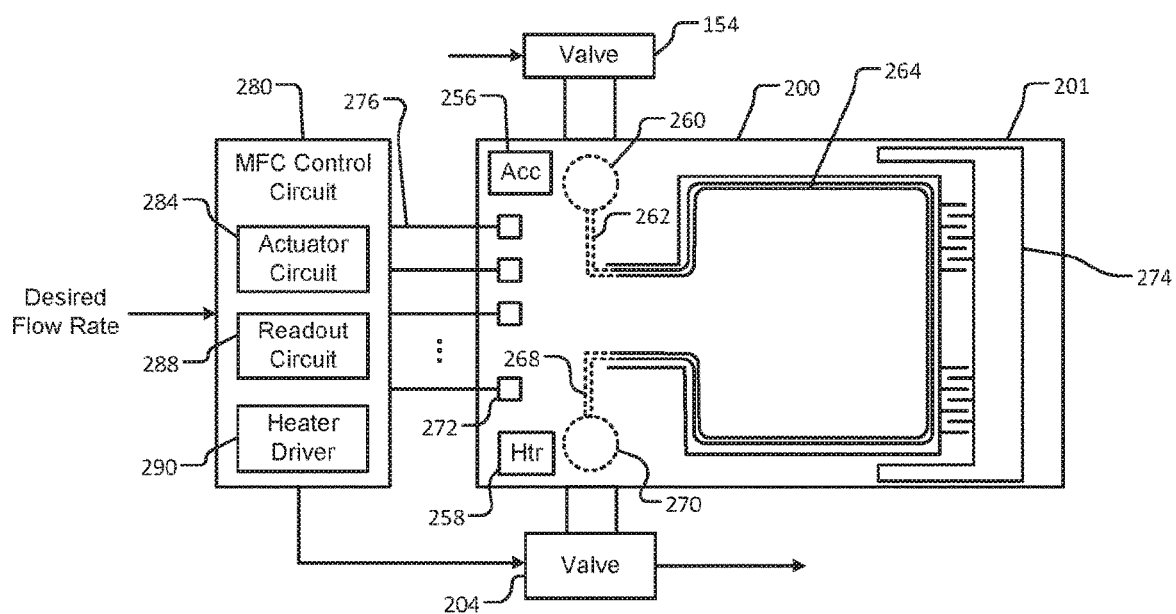

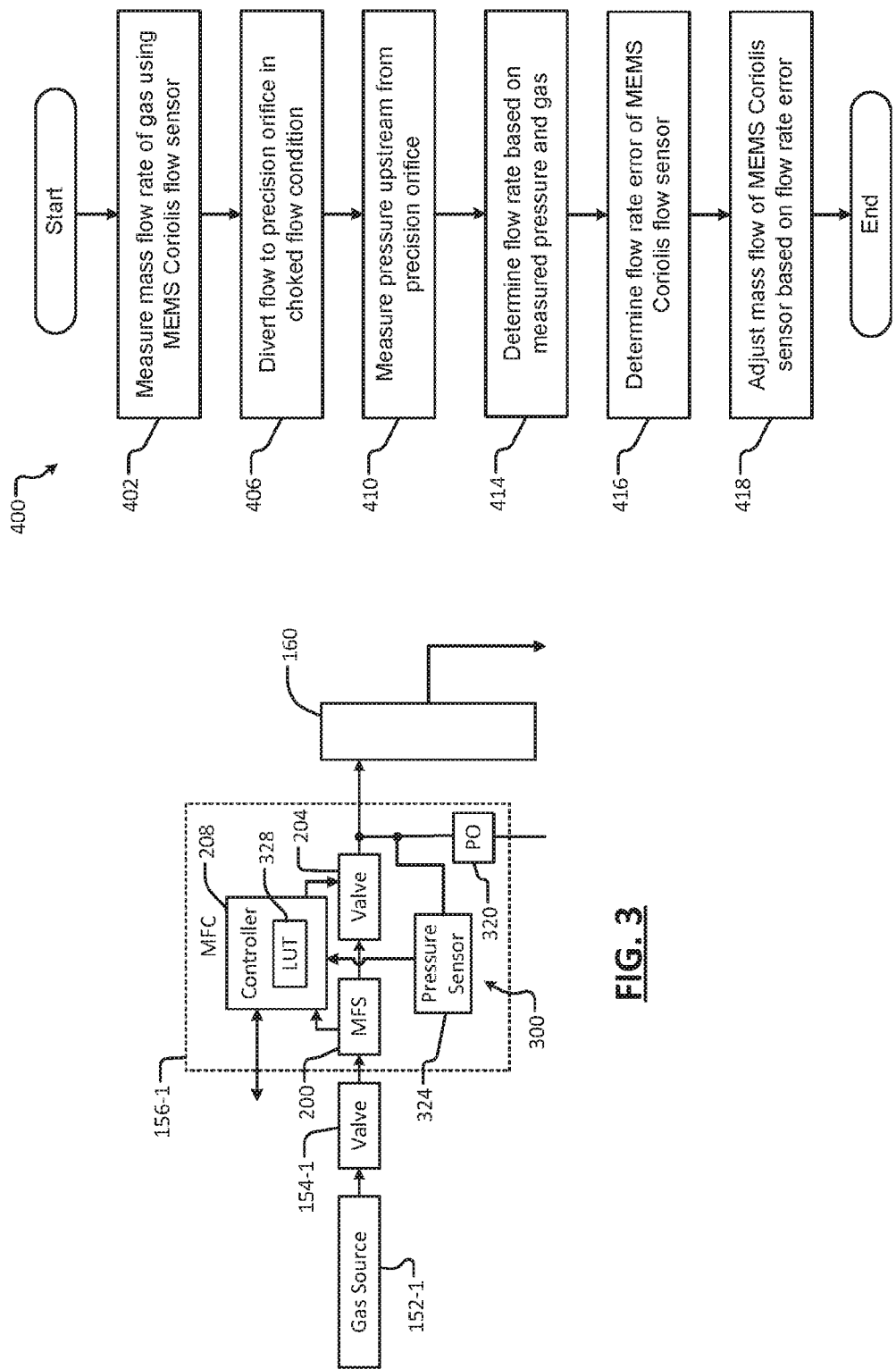

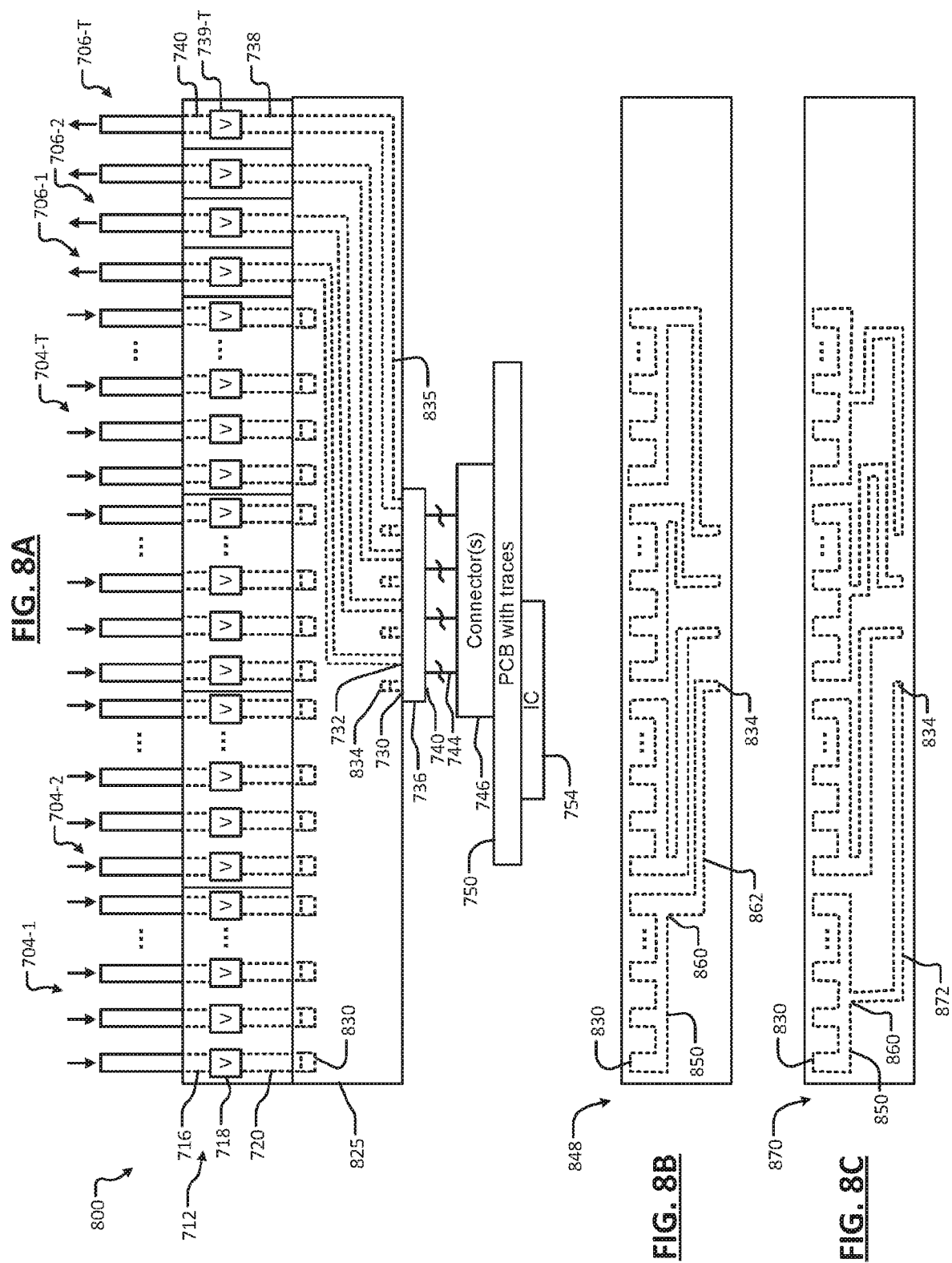

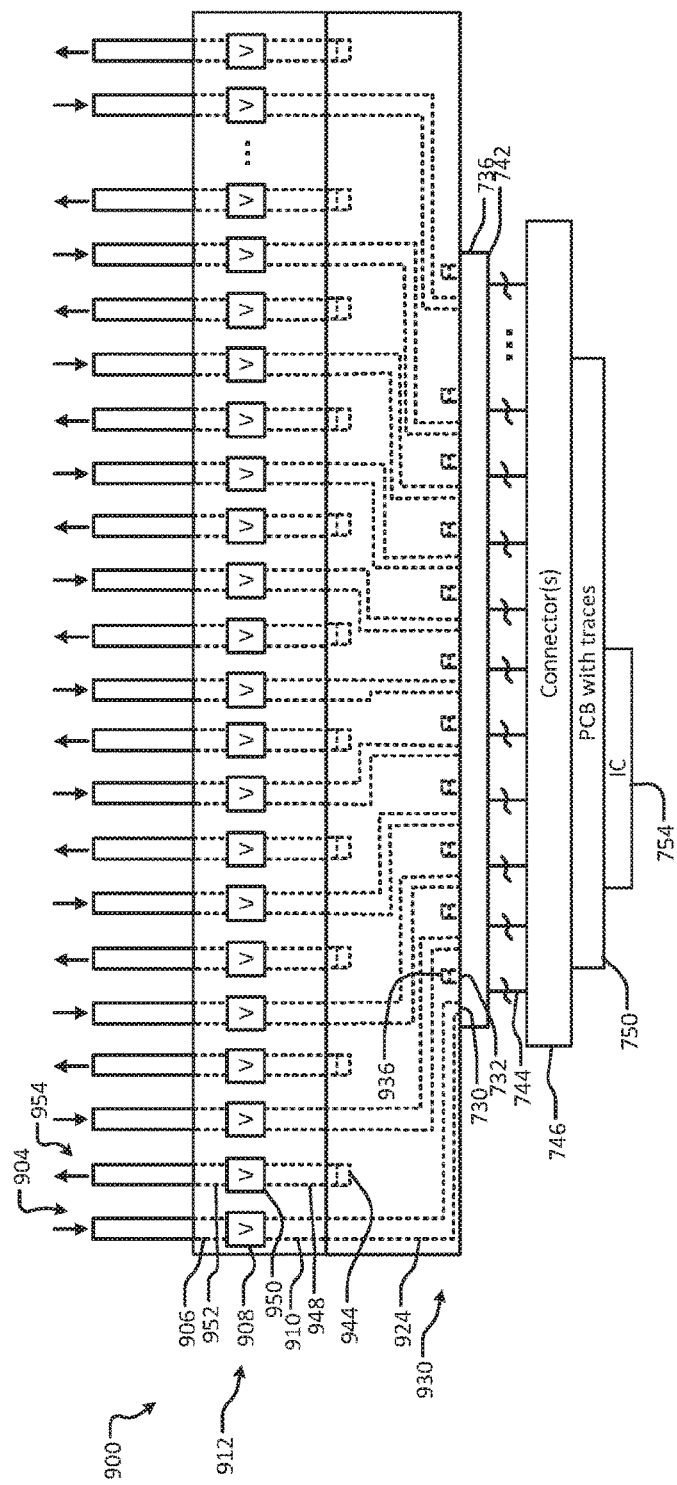
FIG. 9A
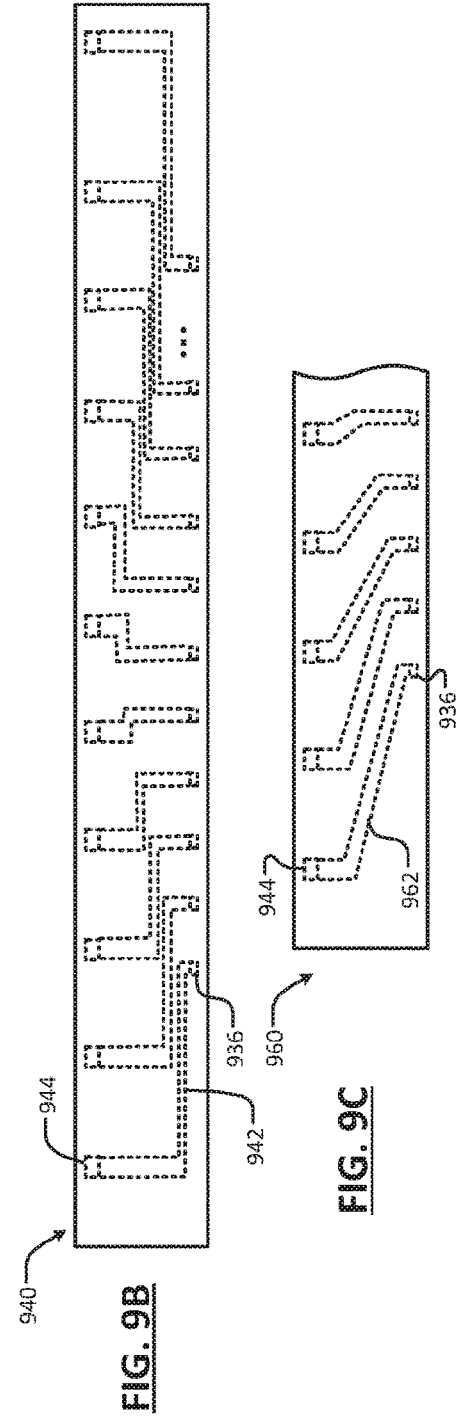
FIG. 9B
FIG. 9C

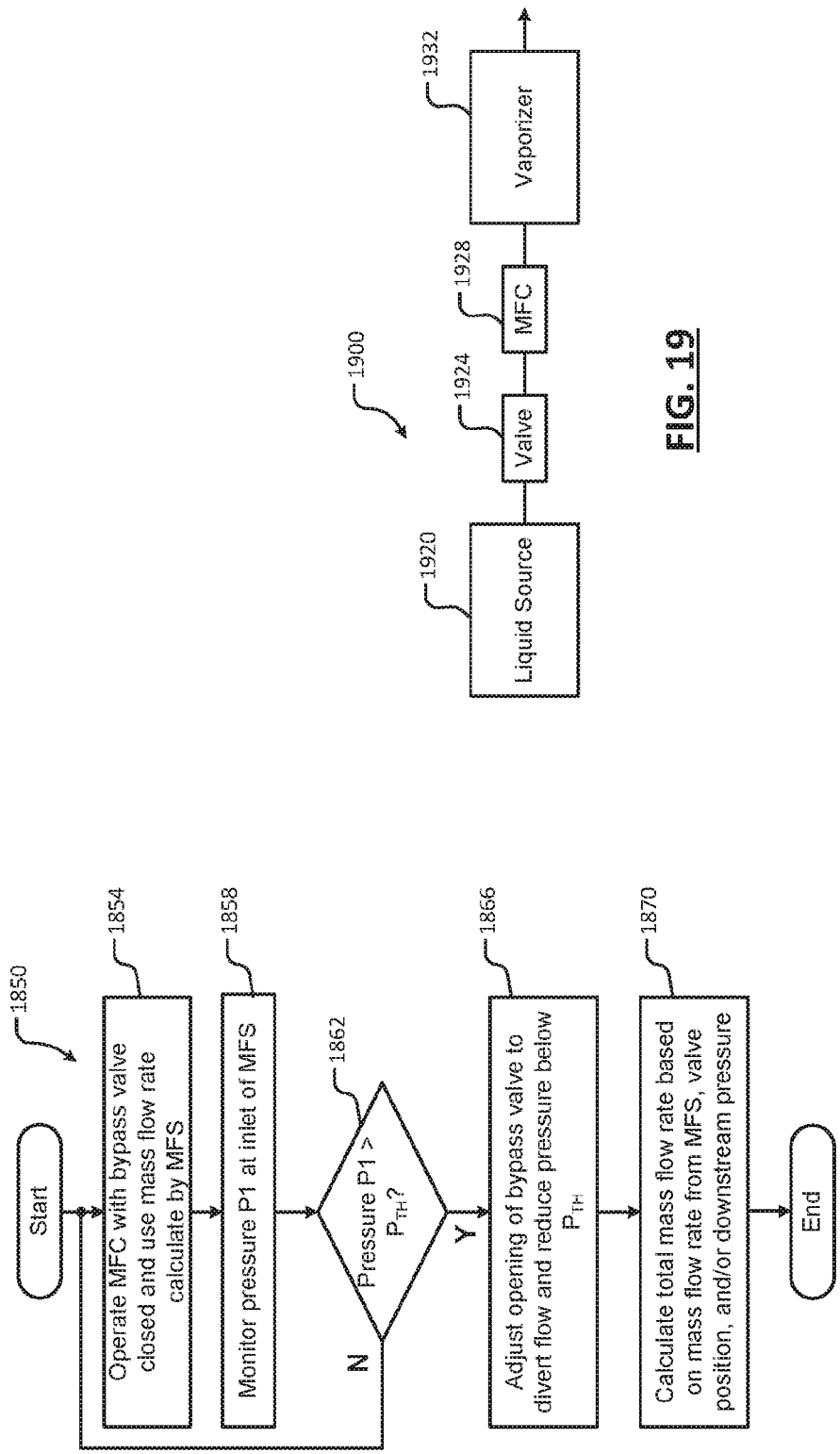

MEMS CORIOLIS GAS FLOW CONTROLLER

CROSS-REFERENCE TO RELATED APPLICATIONS

This application is a U.S. National Phase Application under 35 U.S.C. 371 of International Application No. PCT/US2019/025389, filed on Apr. 2, 2019, which claims the benefit of U.S. Provisional Application No. 62/673,382 filed on May 18, 2018 and U.S. Provisional Application No. 62/652,019, filed on Apr. 3, 2018. The entire disclosures of the applications referenced above are incorporated herein by reference.

FIELD

The present disclosure relates to substrate processing, and more particularly to controlling flow of fluids such as gases in a substrate processing system using mass flow controllers including microelectromechanical (MEMS) Coriolis flow sensors.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Substrate processing systems are used to deposit, etch, ash, clean or otherwise treat film on a substrate such as a semiconductor wafer. During treatment, the substrate may be arranged in a processing chamber and exposed to one or more gas mixtures. In some examples, plasma may be used to cause chemical reactions to occur.

Mass flow controllers (MFCs) are used to control metering of gases that are delivered to the substrate processing chamber. More recent recipes for processes such as chemical vapor deposition (CVD), atomic layer deposition (ALD) and/or atomic layer etching (ALE) require relatively low gas flow rates and fast gas exchange times. Problems have been encountered when using current MFCs such as thermal or pressure-based MFCs for these applications.

SUMMARY

A fluid delivery system includes N first valves. Inlets of the N first valves are fluidly connected to N gas sources, respectively, where N is an integer greater than zero. N mass flow controllers include a microelectromechanical (MEMS) Coriolis flow sensor having an inlet in fluid communication with an outlet of a corresponding one of the N first valves. A second valve has an inlet in fluid communication with an outlet of the MEMS Coriolis flow sensor and an outlet supplying fluid to treat a substrate arranged in a processing chamber. A controller in communication with the MEMS Coriolis flow sensor is configured to determine at least one of a mass flow rate and a density of fluid flowing through the MEMS Coriolis flow sensor.

In other features, a manifold is in fluid communication with the outlets of the second valves of the N mass flow controllers, respectively. The processing chamber is in fluid communication with an outlet of the manifold. At least one of the N mass flow controllers further comprises a precision orifice including an inlet fluidly connected to the outlet of the second valve and a pressure sensor to sense pressure between the outlet of the second valve and the inlet of the precision orifice.

In other features, the controller of the at least one of the N mass flow controllers is configured to perform flow verification based on the pressure sensed by the pressure sensor of the at least one of the N mass flow controllers. The controller of the at least one of the N mass flow controllers includes a lookup table that outputs a verified mass flow rate and that is indexed by the pressure.

In other features, M of the MEMS Coriolis flow sensor are arranged on a single integrated circuit, where M is an integer that is greater than one and less than or equal to N. The MEMS Coriolis flow sensor includes a tube though which the fluid flows, the MEMS Coriolis flow sensor vibrates the tube at a resonant frequency during measurement, and the tube is made of semiconductor material.

In other features, the tube has an inner diameter in a range from 10 μm to 100 μm; and the MEMS Coriolis flow sensor measures mass flow rates that are less than 1000 sccm. The MEMS Coriolis flow sensor measures mass flow rates that are less than 100 sccm. The MEMS Coriolis flow sensor measures mass flow rates that are less than 10 sccm.

In other features, the MEMS Coriolis flow sensor includes a control circuit including an actuator circuit configured to vibrate the tube at the resonant frequency; a capacitive sensing circuit configured to generate a signal in response to vibration of the tube; and a readout circuit configured to receive the signal.

In other features, the MEMS Coriolis flow sensor of at least one of the N mass flow controllers further includes an accelerometer. The accelerometer is configured to measure vibration of the MEMS Coriolis flow sensor. The controller of the at least one of the N mass flow controllers is configured to generate an error notification when the vibration of the MEMS Coriolis flow sensor of the at least one of the N mass flow controllers is greater than a predetermined vibration threshold.

In other features, the controller of the at least one of the N mass flow controllers is configured detect a state of the MEMS Coriolis flow sensor of the at least one of the N mass flow controllers based on an output of the accelerometer. The controller of the at least one of the N mass flow controllers is configured to select one of a plurality of calibrations for the at least one of the N mass flow controllers based on the detected state.

A substrate processing system includes the fluid delivery system, the processing chamber; and a substrate support arranged in the processing chamber to support the substrate. The fluid delivery system delivers fluid to the processing chamber. The substrate processing system performs etching.

A substrate processing system includes the fluid delivery system, the processing chamber, and a substrate support arranged in the processing chamber to support the substrate. The fluid delivery system delivers fluid to the processing chamber, and wherein the substrate processing system performs deposition.

A fluid delivery system includes a first valve having an inlet fluidly connected to a gas source. A mass flow controller comprises a microelectromechanical (MEMS) Coriolis flow sensor having an inlet in fluid communication with an outlet of the first valve; a second valve having an inlet in fluid communication with an outlet of the MEMS Coriolis flow sensor and an outlet supplying fluid to treat a substrate arranged in a processing chamber; a heater to heat the MEMS Coriolis flow sensor; a temperature sensor to sense a temperature of the MEMS Coriolis flow sensor; and a controller in communication with the MEMS Coriolis flow sensor. The controller is configured to determine at least one of a mass flow rate and a density of fluid flowing through the MEMS Coriolis flow sensor; and cause the heater to heat the MEMS Coriolis flow sensor when the temperature is less than a predetermined temperature threshold.

In other features, the MEMS Coriolis flow sensor includes a tube though which the fluid flows, the MEMS Coriolis flow sensor vibrates the tube at a resonant frequency during measurement, and the tube is made of semiconductor material.

In other features, the tube has an inner diameter in a range from 10 μm to 100 μm. The MEMS Coriolis flow sensor measures mass flow rates that are less than 1000 sccm. The MEMS Coriolis flow sensor measures mass flow rates that are less than 100 sccm. The MEMS Coriolis flow sensor measures mass flow rates that are less than 10 sccm.

In other features, the MEMS Coriolis flow sensor includes a control circuit including an actuator circuit configured to vibrate the tube at the resonant frequency; a capacitive sensing circuit configured to generate a signal in response to vibration of the tube; and a readout circuit configured to receive the signal.

In other features, the MEMS Coriolis flow sensor of the mass flow controller further includes an accelerometer. The accelerometer is configured to measure vibration of the MEMS Coriolis flow sensor, and the controller of the mass flow controller is configured to generate an error notification when the vibration of the MEMS Coriolis flow sensor of the mass flow controller is greater than a predetermined vibration threshold.

In other features, the controller of the mass flow controller is configured to detect a state of the MEMS Coriolis flow sensor of the mass flow controller based on an output of the accelerometer. The controller of the mass flow controller is configured to select one of a plurality of calibrations for the mass flow controller based on the detected state.

A substrate processing system includes the fluid delivery system, the processing chamber, a substrate support arranged in the processing chamber to support the substrate. The fluid delivery system delivers fluid to the processing chamber. The substrate processing system performs etching. The substrate processing system performs deposition.

A fluid delivery system includes a first valve having an inlet fluidly connected to a gas source. A mass flow controller includes a microelectromechanical (MEMS) Coriolis flow sensor having an inlet in fluid communication with an outlet of the first valve; a second valve having an inlet in fluid communication with an outlet of the MEMS Coriolis flow sensor and an outlet supplying fluid to treat a substrate arranged in a processing chamber; a sensor to detect at least one parameter of the MEMS Coriolis flow sensor; and a controller in communication with the sensor and the MEMS Coriolis flow sensor. The controller is configured to determine at least one of a mass flow rate and a density of fluid flowing through the MEMS Coriolis flow sensor, to select one of a plurality of calibrations of the MEMS Coriolis flow sensor based on the at least one parameter, and to operate the MEMS Coriolis flow sensor using the selected one of the plurality of calibrations.

In other features, the sensor is selected from a group consisting of an accelerometer and a vibration sensor. The sensor is configured to detect a first parameter of the MEMS Coriolis flow sensor before the second valve of the MEMS Coriolis flow sensor opens. The sensor is configured to detect a second parameter of the MEMS Coriolis flow sensor after the second valve of the MEMS Coriolis flow sensor opens. The controller is configured to diagnose operation of the mass flow controller based on the first parameter and the second parameter.

In other features, the controller is configured to detect a plurality of parameters of the MEMS Coriolis flow sensor at a plurality of times, respectively, when the first valve of the MEMS Coriolis flow sensor is commanded to a closed position and to diagnose operation of the valve of the MEMS Coriolis flow sensor based on the plurality of parameters.

In other features, the controller is configured to generate a plurality of differences between the parameters at the plurality of times. The controller is configured to diagnose operation of the valve of the MEMS Coriolis flow sensor based on the plurality of differences. The MEMS Coriolis flow sensor includes a tube though which the fluid flows, the MEMS Coriolis flow sensor vibrates the tube at a resonant frequency during measurement, and the tube is made of semiconductor material.

In other features, the tube has an inner diameter in a range from 10 μm to 100 μm. The MEMS Coriolis flow sensor measures mass flow rates that are less than 1000 sccm. The MEMS Coriolis flow sensor measures mass flow rates that are less than 100 sccm. The MEMS Coriolis flow sensor measures mass flow rates that are less than 10 sccm.

In other features, the MEMS Coriolis flow sensor includes a control circuit including an actuator circuit configured to vibrate the tube at the resonant frequency; a capacitive sensing circuit configured to generate a signal in response to vibration of the tube; and a readout circuit configured to receive the signal.

A substrate processing system includes the fluid delivery system, the processing chamber, and a substrate support arranged in the processing chamber to support the substrate, The substrate processing system performs etching or deposition.

In other features, the accelerometer measures at least one of acceleration and vibration.

A fluid delivery system includes a first valve having an inlet fluidly connected to a gas source. A mass flow controller includes a microelectromechanical (MEMS) Coriolis flow sensor including a tube and having an inlet in fluid communication with an outlet of the first valve; a second valve having an inlet in fluid communication with an outlet of the MEMS Coriolis flow sensor and an outlet supplying fluid to treat a substrate arranged in a processing chamber; and a controller in communication with the MEMS Coriolis flow sensor. The controller is configured to determine at least one of a mass flow rate and a density of fluid flowing through the MEMS Coriolis flow sensor, to cause the tube to vibrate and to detect a resonant frequency of a tube of the MEMS Coriolis flow sensor.

In other features, the tube is made of semiconductor material. The tube has an inner diameter in a range from 10 μm to 100 μm. The MEMS Coriolis flow sensor measures mass flow rates that are less than 1000 sccm. The MEMS Coriolis flow sensor measures mass flow rates that are less than 100 sccm. The MEMS Coriolis flow sensor measures mass flow rates that are less than 10 sccm.

In other features, the MEMS Coriolis flow sensor includes a control circuit including an actuator circuit configured to vibrate the tube at the resonant frequency; a capacitive sensing circuit configured to generate a signal in response to movement of the tube; and a readout circuit configured to receive the signal.

In other features, the controller is configured to compare the resonant frequency to a predetermined threshold. The controller is configured to selectively alter operation of the MEMS Coriolis flow sensor based on the comparison. The controller is configured to selectively shut down the MEMS Coriolis flow sensor based on the comparison. The MEMS Coriolis flow sensor includes an accelerometer. The controller is configured to determine the resonant frequency based on the acceleration.

A substrate processing system includes the fluid delivery system, the processing chamber, and a substrate support arranged in the processing chamber to support the substrate. The fluid delivery system delivers fluid to the processing chamber. The substrate processing system performs etching. The substrate processing system performs deposition.

A fluid delivery system includes a first valve having an inlet fluidly connected to a gas source. A mass flow controller includes a microelectromechanical (MEMS) Coriolis flow sensor having an inlet in fluid communication with an outlet of the first valve and including a tube that is made of semiconductor material and that resonates in response to a drive signal. A second valve has an inlet in fluid communication with an outlet of the MEMS Coriolis flow sensor and an outlet supplying fluid to treat a substrate arranged in a processing chamber. A controller communicates with the MEMS Coriolis flow sensor and is configured to cause the tube to resonate; determine at least one of a mass flow rate and a density of fluid flowing through the MEMS Coriolis flow sensor; monitor the drive signal that drives the tube at a plurality of times; and compare a parameter of the drive signal at one of the plurality of times to a parameter of the drive signal at another one of the plurality times.

In other features, the controller is configured to estimate a stiffness of the tube based on the drive signal. The controller is configured to generate an estimated lifetime of the MEMS Coriolis flow sensor based on the estimated stiffness. The controller is configured to selectively generate a notification based on the estimated lifetime of the MEMS Coriolis flow sensor.

In other features, the tube has an inner diameter in a range from 10 µm to 100 µm. The MEMS Coriolis flow sensor measures mass flow rates that are less than 1000 sccm. The MEMS Coriolis flow sensor measures mass flow rates that are less than 100 sccm. The MEMS Coriolis flow sensor measures mass flow rates that are less than 10 sccm.

A substrate processing system includes the fluid delivery system, the processing chamber, and a substrate support arranged in the processing chamber to support the substrate. The fluid delivery system delivers fluid to the processing chamber. The substrate processing system performs etching. The substrate processing system performs deposition.

A fluid delivery system includes a first valve having an inlet fluidly connected to a gas source. A mass flow controller includes a microelectromechanical (MEMS) Coriolis flow sensor and having an inlet in fluid communication with an outlet of the first valve; a second valve having an inlet in fluid communication with an outlet of the MEMS Coriolis flow sensor and an outlet supplying fluid to treat a substrate arranged in a processing chamber; a first pressure sensor to monitor an upstream pressure at the inlet of the MEMS Coriolis flow sensor; and a bypass valve having an inlet in fluid communication with an inlet of the MEMS Coriolis flow sensor and an outlet in fluid communication with an outlet of the second valve. A controller in communication with the MEMS Coriolis flow sensor is configured to determine at least one of a mass flow rate and a density of fluid flowing through the MEMS Coriolis flow sensor; and monitor the upstream pressure and selectively control the bypass valve based on the upstream pressure.

In other features, the second valve includes an on/off valve and a restricted orifice in fluid communication with the outlet of the on/off valve. The second valve includes a variable valve. The controller is configured to compare the upstream pressure to a predetermined pressure threshold and to cause the bypass valve to open when the pressure is greater than the predetermined pressure threshold.

In other features, the controller is configured to select one of a plurality of predetermined pressure thresholds based on a selected one of a plurality of gases flowing through the MEMS Coriolis flow sensor, respectively, and to cause the bypass valve to open when the upstream pressure is greater than the selected one of the plurality of predetermined pressures.

In other features, a second pressure sensor senses a downstream pressure at an outlet of the second valve, and wherein the controller is configured to determine a total mass flow rate based on the mass flow rate determined by the MEMS Coriolis flow sensor and the downstream pressure.

In other features, the second valve includes a variable valve and further comprising a second pressure sensor to sense a downstream pressure at an outlet of the second valve. The controller is configured to determine a total mass flow rate based on the mass flow rate determined by the MEMS Coriolis flow sensor, a position of the second valve and the downstream pressure.

In other features, the MEMS Coriolis flow sensor includes a tube though which the fluid flows, the MEMS Coriolis flow sensor vibrates the tube at a resonant frequency during measurement, and the tube is made of semiconductor material.

In other features, the tube has an inner diameter in a range from 10 µm to 100 µm. The MEMS Coriolis flow sensor measures mass flow rates that are less than 1000 sccm. The MEMS Coriolis flow sensor measures mass flow rates that are less than 100 sccm. The MEMS Coriolis flow sensor measures mass flow rates that are less than 10 sccm.

A substrate processing system includes the fluid delivery system, the processing chamber, and a substrate support arranged in the processing chamber to support the substrate. The fluid delivery system delivers fluid to the processing chamber. The substrate processing system performs etching. The substrate processing system performs deposition.

A substrate processing system includes a processing chamber; a substrate support arranged in the processing chamber to support a substrate; and a first gas delivery system to deliver gas mixtures to the processing chamber. A second gas delivery system includes a first valve fluidly connected to a gas source. A mass flow controller includes a microelectromechanical (MEMS) Coriolis flow sensor having an inlet in fluid communication with an outlet of the first valve. A second valve includes an inlet in fluid communication with the MEMS Coriolis flow sensor and an outlet supplying the processing chamber. The MEMs Coriolis flow sensor and the outlet of the second valve are located within a predetermined distance of the processing chamber, wherein the predetermined distance is less than or equal to 10 inches.

In other features, the first gas delivery system includes N first valves. Inlets of the N first valves are fluidly connected to N gas sources, respectively, where N is an integer greater than zero. N mass flow controllers include a microelectromechanical (MEMS) Coriolis flow sensor having an inlet in fluid communication with an outlet of a corresponding one of the N valves; a second valve having an inlet in fluid communication with an outlet of the MEMS Coriolis flow sensor and an outlet in communication with the processing chamber; and a controller in communication with the MEMS flow sensor and configured to determine at least one of a mass flow rate and a density of fluid flowing through the MEMS Coriolis flow sensor.

In other features, the MEMS Coriolis flow sensor includes a tube though which the fluid flows, the MEMS Coriolis flow sensor vibrates the tube at a resonant frequency during measurement, and the tube is made of semiconductor material.

In other features, the tube has an inner diameter in a range from 10 µm to 100 µm. The MEMS Coriolis flow sensor measures mass flow rates that are less than 1000 sccm. The MEMS Coriolis flow sensor measures mass flow rates that are less than 100 sccm. The MEMS Coriolis flow sensor measures mass flow rates that are less than 10 sccm.

In other features, the substrate processing system performs etching or deposition. The MEMS Coriolis flow sensor includes a tube though which the fluid flows, the MEMS Coriolis flow sensor vibrates the tube at a resonant frequency during measurement, and the tube is made of semiconductor material.

In other features, the tube has an inner diameter in a range from 10 µm to 100 µm. The MEMS Coriolis flow sensor measures mass flow rates that are less than 1000 sccm. The MEMS Coriolis flow sensor measures mass flow rates that are less than 100 sccm. The MEMS Coriolis flow sensor measures mass flow rates that are less than 10 sccm.

A fluid delivery system includes a first valve having an inlet fluidly connected to a gas source and a mass flow controller. The mass flow controller includes a microelectromechanical (MEMS) Coriolis flow sensor including an inlet, an outlet and a resonating tube between the inlet and the outlet; a second valve having an inlet in fluid communication with the outlet of the MEMS Coriolis flow sensor and an outlet supplying fluid to treat a substrate in a processing chamber; a first pressure sensor to sense a first pressure at the inlet of the resonating tube; a second pressure sensor to sense a second pressure at an outlet of the resonating tube; a first temperature sensor to sense a first temperature of the fluid at the inlet of the resonating tube; a second temperature sensor to sense a second temperature of the fluid at the outlet of the resonating tube; and a controller. The controller communicates with the MEMS Coriolis flow sensor and is configured to determine at least one of a mass flow rate and a density of fluid flowing through the MEMS Coriolis flow sensor and to calculate a compressibility of the fluid based on the mass flow rate, the first temperature, the second temperature, the first pressure and the second pressure.

In other features, the controller is configured to calculate a temperature difference between the second temperature and the first temperature and a pressure difference between the second pressure and the first pressure.

In other features, the compressibility of the fluid is based on the mass flow rate, the temperature difference, and the pressure difference. In other features, the controller outputs the compressibility to an upstream flow control device.

In other features, the upstream flow control device at least one of calibrates the upstream flow control device, diagnoses the upstream flow control device and adjusts operation of the upstream flow control device based on the compressibility.

In other features, the controller outputs the compressibility to a downstream flow control device. The downstream flow control device at least one of calibrates the downstream flow control device, diagnoses the downstream flow control device and adjusts operation of the downstream flow control device based on the compressibility.

In other features, the MEMS Coriolis flow sensor includes a tube though which the fluid flows, the MEMS Coriolis flow sensor vibrates the tube at a resonant frequency during measurement, and the tube is made of semiconductor material.

In other features, the tube has an inner diameter in a range from 10 µm to 100 µm. The MEMS Coriolis flow sensor measures mass flow rates that are less than 1000 sccm. The MEMS Coriolis flow sensor measures mass flow rates that are less than 100 sccm. The MEMS Coriolis flow sensor measures mass flow rates that are less than 10 sccm.

A substrate processing system includes the fluid delivery system, the processing chamber, and a substrate support arranged in the processing chamber to support the substrate. The substrate processing system performs etching or deposition.

A fluid delivery system includes N first valves. Inlets of the N first valves are fluidly connected to N gas sources, respectively, where N is an integer greater than zero. A mass flow controller includes a microelectromechanical (MEMS) Coriolis flow sensor having an inlet in fluid communication with outlets of the N first valves; a second valve having an inlet in fluid communication with an outlet of the MEMS Coriolis flow sensor and an outlet supplying fluid to treat a substrate in a processing chamber; and a controller. The controller communicates with the MEMS Coriolis flow sensor and is configured to select one of the N first valves, to open the selected one of the N first valves and to determine at least one of a mass flow rate and a density of fluid flowing from the selected one of the N valves through the MEMS Coriolis flow sensor.

In other features, a third valve is connected to the outlets of the N first valves. After closing the N first valves and prior to opening the selected one of the N first valves, the controller is configured to open the third valve to evacuate a volume between the outlets of the N first valves and the inlet of the MEMS Coriolis flow sensor. The mass flow controller further comprises a precision orifice fluidly connected to the outlet of the second valve; and a pressure sensor to sense pressure between the outlet of the second valve and an inlet of the precision orifice of the mass flow controller.

In other features, the controller is configured to perform flow verification based on the pressure sensed by the pressure sensor of the mass flow controller. After closing the N first valves and prior to opening the selected one of the N first valves, the controller is configured to detect valve leakage based on the pressure sensed by the pressure sensor of the mass flow controller.

In other features, the MEMS Coriolis flow sensor includes a tube though which the fluid flows, the MEMS Coriolis flow sensor vibrates the tube at a resonant frequency during measurement, and the tube is made of semiconductor material. The tube has an inner diameter in a range from 10 µm to 100 µm. The MEMS Coriolis flow sensor measures mass flow rates that are less than 1000 sccm. The MEMS Coriolis flow sensor measures mass flow rates that are less than 100 sccm. The MEMS Coriolis flow sensor measures mass flow rates that are less than 10 sccm.

A substrate processing system includes the fluid delivery system, the processing chamber, and a substrate support arranged in the processing chamber to support the substrate. The substrate processing system performs etching or deposition.

A fluid delivery system includes a valve block including: first passages fluidly connecting first inlets of the valve block to inlets of first valves; a manifold fluidly connecting outlets of the first valves to a first outlet of the valve block; a second passage fluidly connecting an outlet of a second valve to a second outlet of the valve block; and a third passage fluidly connecting a second inlet of the valve block to an inlet of the second valve. A microelectromechanical (MEMS) Coriolis flow sensor includes a resonating tube having an inlet and an outlet. An interposer is made of semiconductor material and is arranged between the valve block and the MEMS Coriolis flow sensor.

In other features, the interposer includes a first passage fluidly connecting the first outlet of the valve block to the inlet of the MEMS Coriolis flow sensor, and a second passage fluidly connecting the outlet of the MEMS Coriolis flow sensor to the second inlet of the valve block.

In other features, a first area of the first passage of the interposer located adjacent to the valve block is greater than a second area of the first passage located adjacent to the MEMS Coriolis flow sensor and wherein a third area of the second passage of the interposer located adjacent to the valve block is greater than a fourth area of the first passage located adjacent to the MEMS Coriolis flow sensor.

In other features, the MEMS Coriolis flow sensor includes a tube though which the fluid flows, the MEMS Coriolis flow sensor vibrates the tube at a resonant frequency during measurement, and the tube is made of semiconductor material. The tube has an inner diameter in a range from 10 μm to 100 μm. The MEMS Coriolis flow sensor measures mass flow rates that are less than 1000 sccm. The MEMS Coriolis flow sensor measures mass flow rates that are less than 100 sccm. The MEMS Coriolis flow sensor measures mass flow rates that are less than 10 sccm.

A substrate processing system includes the fluid delivery system, the processing chamber; and a substrate support arranged in the processing chamber to support the substrate. The substrate processing system performs etching or deposition.

A fluid delivery system includes a valve block including T groups of N inlet passages, where T and N are integers greater than one; T groups of N inlet valves in fluid communication with the T groups of N inlet passages; T groups of N outlet passages in fluid communication with outlets of the T groups of N inlet valves, wherein the N outlet passages of the T groups connect at T nodes, respectively; T inlet passages fluidly connected to the T nodes; T outlet valves; and T outlet passages fluidly connected to inlets of the T outlet valves; T microelectromechanical (MEMS) Coriolis flow sensors each including an inlet and an outlet; and an interposer made of semiconductor material and arranged between the valve block and the T MEMS Coriolis flow sensors.

In other features, the interposer includes T inlet passages having a first cross-sectional area located adjacent to the valve block and a second cross-sectional area located adjacent to the T MEMS Coriolis flow sensors, respectively. The first cross-sectional area is greater than the second cross-sectional area. The interposer further comprises T outlet passages having the first cross-sectional area located adjacent to the valve block and the second cross-sectional area located adjacent to the T MEMS Coriolis flow sensors, respectively.

In other features, two or more of the T MEMS Coriolis flow sensors are implemented on a single integrated circuit. The T inlet passages and the T outlet passages extend in a single plane. The T inlet passages and T outlet passages extend in more than one plane.

In other features, the T MEMS Coriolis flow sensors include a tube though which the fluid flows, the T MEMS Coriolis flow sensors vibrate the tube at a resonant frequency during measurement, and the tube is made of semiconductor material.

In other features, the tube has an inner diameter in a range from 10 μm to 100 μm. The T MEMS Coriolis flow sensors measure mass flow rates that are less than 1000 sccm. The T MEMS Coriolis flow sensors measure mass flow rates that are less than 100 sccm. The T MEMS Coriolis flow sensors measure mass flow rates that are less than 10 sccm.

A substrate processing system includes the fluid delivery system, the processing chamber; and a substrate support arranged in the processing chamber to support the substrate. The substrate processing system performs etching or deposition.

A fluid delivery system includes a valve block including T groups of N inlet passages, where T and N are integers greater than one; T groups of N inlet valves in fluid communication with the T groups of N inlet passages; T groups of N outlet passages in fluid communication with outlets of the T groups of N inlet valves; T microelectromechanical (MEMS) Coriolis flow sensors each including an inlet and an outlet; an interposer made of semiconductor material and arranged between the valve block and the T MEMS Coriolis flow sensors. The interposer includes T groups of N inlet passages connected to T first nodes and T first passages fluidly connecting the T first nodes to inlets of the T MEMS Coriolis flow sensors, respectively; and T groups of N outlet passages connected to T second nodes and T second passages fluidly connecting the T second nodes to outlets of the T MEMS Coriolis flow sensors, respectively.

In other features, the T groups of N inlet passages and the T groups of N outlet passages have a first cross-sectional area adjacent to the valve block and the T first passages and the T second passages have a second cross-sectional area adjacent to the T MEMS Coriolis flow sensors, respectively and wherein the first cross-sectional area is greater than the second cross-sectional area.

In other features, two or more of the T MEMS Coriolis flow sensors are implemented on a single integrated circuit. The T groups of inlet passages and the T groups of outlet passages are arranged in a single plane. The T inlet passages and T outlet passages are arranged in more than one plane.

In other features, the T MEMS Coriolis flow sensors include a tube though which the fluid flows, the T MEMS Coriolis flow sensors vibrate the tube at a resonant frequency during measurement, and the tube is made of semiconductor material.

In other features, the tube has an inner diameter in a range from 10 μm to 100 μm. The T MEMS Coriolis flow sensors measure mass flow rates that are less than 1000 sccm. The T MEMS Coriolis flow sensors measure mass flow rates that are less than 100 sccm. The T MEMS Coriolis flow sensors measure mass flow rates that are less than 10 sccm.

A substrate processing system includes the fluid delivery system, the processing chamber; and a substrate support arranged in the processing chamber to support the substrate. The substrate processing system performs etching or deposition.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2A is a functional block diagram of a gas delivery system including the MFC with a MEMS Coriolis flow sensor according to the present disclosure;

FIG. 2B is a side cross-sectional view illustrating an example of the MEMS Coriolis flow sensor attached to a valve block according to the present disclosure;

FIG. 2C is a functional block diagram of an example of the MFC with the MEMS Coriolis flow sensor according to the present disclosure;

FIG. 3 is a functional block diagram of a gas delivery system including the MFC with a MEMS Coriolis flow sensor and an absolute flow verifier according to the present disclosure;

FIG. 4 is a flowchart of a method for performing absolute flow verification (AFV) using the system in FIG. 3 according to the present disclosure;

FIGS. 8A to 8C is a functional block diagram of another example of a multiplexed MFC and an interposer block according to the present disclosure;

FIGS. 9A to 9C is a functional block diagram of another example of a MFC and an interposer block according to the present disclosure;

FIG. 18C is a flowchart of an example of a method for monitoring upstream pressure of an MFC including a MEMS Coriolis flow sensor to prevent condensation according to the present disclosure;

FIG. 19 is a functional block diagram of an example of an MFC including a MEMS Coriolis flow sensor for sensing and delivering liquid to a vaporizer according to the present disclosure;

In the drawings, reference numbers may be reused to identify similar and/or identical elements.

DETAILED DESCRIPTION

Figure 1:
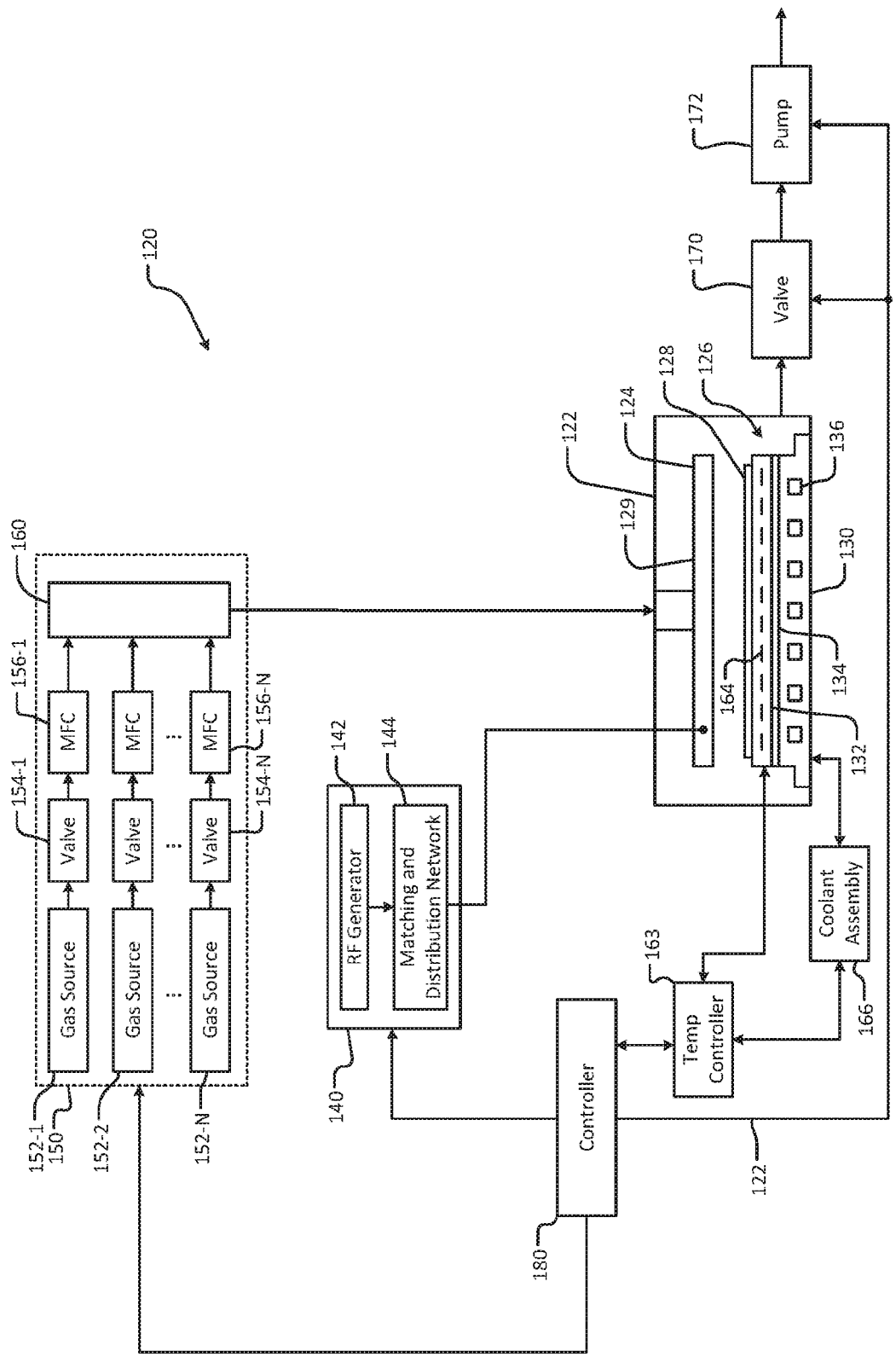
FIG. 1 is a functional block diagram of a substrate processing system including a mass flow controller (MFC) with a microelectromechanical (MEMS)-based Coriolis flow sensor according to the present disclosure.

Substrate processing systems and methods according to the present disclosure relate to mass flow controllers (MFCs)

including microelectromechanical (MEMS)-based Coriolis flow sensors to measure flow parameters such as mass flow rate and/or density of one or more gas flows delivered to a substrate processing chamber for semiconductor substrates. While the foregoing description describes measurement of mass flow rates of gases, the disclosure relates to mass flow control of other fluids such as liquids or mixtures of liquids and gases. Furthermore, while the present disclosure describes mass flow control in semiconductor processing environments, the foregoing disclosure applies to measurement of mass flow rates in other environments measuring low flow rates.

In some examples, a gas box supplies a plurality of gases or gas mixtures and includes MFCs (each including a MEMS Coriolis flow sensor) that are multiplexed to reduce the overall cost of the gas box. More particularly, P inlet tubes for P different gases or gas mixtures (where P is an integer greater than one) are arranged in T groups of similar or compatible gas types (where P and T are integers greater than one). Each group of gases or gas mixtures is controlled by a single MFC including a MEMS Coriolis flow sensor.

In some examples, an interposer block includes internal passages to route the gases to inlets of the MEMS Coriolis flow sensor. In some examples, the interposer block is made of one or more semiconductor materials and is manufactured using a semiconductor process. In some examples, the interposer block is made by etching matching patterns (e.g. mirror images) in first and second substrates (to define both halves of the internal passages), aligning and abutting the etched surfaces and bonding the first and second substrates together. In some examples, the interposer block includes multiple layers (that are made in a similar manner) and connecting vias to provide connections between layers to allow additional flexibility.

In some examples, the internal passages of the interposer block have an inlet diameter that is larger than an outlet diameter located adjacent of the MEMS Coriolis flow sensor. In other words, the passages get narrower in a direction towards the MEMS Coriolis flow sensor. For example, the inlet diameter of the internal passages in the interposer block can have a first diameter (e.g. on the order of W) and the outlet diameter of the interposer block can be on the order of 30 to 1000 micrometers, although other diameters can be used. In other examples, the valve block may also be used to reduce the diameter of the internal passages. For example, the inlet diameter of the valve block has a first diameter and the outlet to the interposer block has a second diameter less than the first diameter. The inlet of the interposer block has the second diameter and the outlet of the interposer block has a third diameter (matching the inlet of the MEMS Coriolis flow sensor) less than the second diameter. The return path is reversed.

In some examples, the MFC further employ absolute flow verification (AFV) to verify flows through the MEMS Coriolis flow sensors. The AFV includes a precision orifice, a pressure sensor and a lookup table or formula (which may be gas specific) to determine flows based on pressure upstream of the precision orifice.

In some examples, the MEMS Coriolis flow sensor includes a heater to heat the MEMS Coriolis flow sensor to a predetermined temperature threshold to prevent corrosion due to certain types of aqueous solutions in the MEMS Coriolis flow sensor. In some examples, the MEMS Coriolis flow sensor also includes an accelerometer to measure environmental acceleration/vibration. In other examples, the accelerometer can be used to determine the orientation or state of the MEMS Coriolis flow sensor. Compensation or adjustment of operation of the MFC can be performed based on the environmental acceleration/vibration and/or detected orientation or state.

In some examples, the outlet valve of the MFC including the MEMS Coriolis flow sensor is used in close proximity (less than 10") to the processing chamber to allow pulsed gases to be delivered to the processing chamber during short pulse intervals typically used during atomic layer deposition (ALD) or atomic layer etching (ALE).

In some examples described herein, the MEMS Coriolis flow sensor is fabricated using semiconductor processes and materials. Gases delivered by the gas delivery system in substrate processing systems may be delivered at relatively high pressures up to 60 psig. The MEMS Coriolis flow sensors can be used to measure lower flow rates (such as those less than 1000 sccm, less than 100 sccm, less than 10 sccm and less than 1 sccm).

Due to the low flow rates to be measured, the diameter of stainless steel tubes of conventional MEMS Coriolis flow sensors would be difficult to manufacture. In other words, to measure some of the mass flow rates that are desired, the inner diameter of the tubes will typically be on the order of tens of micrometers (e.g. less than 1000 μm, 250 μm or smaller diameters such as 10-100 μm, 30 μm, etc.) rather than the much larger diameters that are typically used for stainless steel tubes and higher flow rates. Additionally, first order resonance is determined by a root of a ratio of stiffness divided by mass. While stainless steel and semiconductor materials such as silicon have comparable stiffness values, silicon has a much smaller mass. Therefore, silicon has a higher resonance frequency. As a result, mass flow sensors using silicon tubes are less prone to noise caused by environmental vibration.

The tube of the MEMS Coriolis flow sensor is fabricated during semiconductor processing using a semiconductor material. For example, the tube may be formed by etching one-half of a predetermined profile in a desired shape of the tube into external surfaces of the first and second substrates. The predetermined profile may include a semicircular, elliptical, rectangular, "U"-shaped, and/or other profile. After the predetermined half profiles are etched, the first and second substrates are arranged in direct contact with the mirrored half profiles facing each other and aligned. The first and second substrates are then bonded together. Then, a conformal deposition process (such as ALD) may be used to deposit a thin layer on an inner surface of the aligned profile to create the tube. For example, the tube may be made of silicon, silicon nitride, silicon dioxide, silicon carbide or other semiconductor material. Afterwards, the tube is removed from the first and second substrates. For example, the material of the first and second substrates is dissolved or removed using a material-selective etching process.

In use, a fluid such as a gas or liquid is input to the inlet of the MEMS Coriolis flow sensor. The fluid passes through the inlet, flows around the tube of the MEMS Coriolis sensor as the tube is vibrated and exits at the outlet. During measurement, a controller controls the actuator to vibrate the tube at a resonant frequency of the tube, receives and processes signals generated by the sensing circuit, and accurately calculates mass flow rate and density of the fluid based on the signals. The MEMS flow sensor accurately measures both the mass flow rate and the density of the fluid flowing through the sensor. The measurements are independent of temperature and pressure.

In some examples, the tube forms a curved loop such as a "D"-shaped loop with adjacent inlets and outlets. The actuator vibrates the tube at the resonant frequency of the tube. When the fluid is introduced into the tube, the resonant frequency of oscillation changes due to the increased inertia associated with the tube and the fluid in the tube. The change in resonant frequency of oscillation ($\Delta f_B$) is directly proportional to the density ($\rho$) of the fluid or $\Delta f_B \propto \rho$.

When fluid travels around the tube, fluid that travels away from an axis of oscillation exerts a force on a first section of the tube that extends away from the axis of oscillation near the inlet of the tube. The force exerted back onto the fluid causes the fluid to experience an increase in angular momentum to match the angular momentum of the tube. As the fluid travels back toward the axis of oscillation through a second section of the tube that extends back toward the axis of oscillation near the outlet, the fluid exerts a force on the second section as its angular momentum is made to decrease.

As a result, the first section of the tube experiences a negative phase shift relative to the central portion of the tube (e.g., the first section lags behind) whereas the second portion of the tube experiences a positive phase shift relative to the central portion of the tube (e.g., the second section oscillates ahead of the central portion of the tube). The degree of phase difference between the first portion and the second portion is directly proportional to the amount of mass or mass flow rate that is flowing through the tube of the MEMS Coriolis flow sensor.

The mass flow rate of a fluid through the MEMS Coriolis flow sensor is related to the phase shift or time lag between the first and second portions of the tube as set forth below:

$$Q_m = \frac{K_u - I_u \omega^2}{2Kd^2} \tau$$

where $K_u$ is the temperature dependent stiffness of the tube, K is a shape-dependent factor, d is the width of the tube, $\tau$ is the time lag, $\omega$ is the oscillation or vibration frequency, and $I_u$ is the inertia of the tube.

Using the density measurement of the fluid that is measured by examining $\Delta f_B$ of the MEMS Coriolis flow sensor, the inertia $I_u$ may be calculated, resulting in an accurate reading of the mass flow rate of the fluid traveling through the MEMS Coriolis flow sensor. As a result, the MEMS Coriolis flow sensor provides accurate determinations of both density and mass flow rate.

In some examples, the MEMS Coriolis flow sensor provides at least two signals to the controller including a first signal related to density and a second signal related mass flow rate. For example, one signal may include oscillation frequency measurements of the tube and the other signal may include phase shift or time lag measurements. The controller receives the signals and calculates the density and the mass flow rate of the fluid traveling through the MEMS Coriolis flow sensor. The controller adjusts an opening in a valve arranged at an outlet (or inlet) of the MEMS Coriolis flow sensor to adjust the flow of the fluid to a desired flow rate. Various types of valves are contemplated including solenoid valves, piezoelectric valves, and MEMS valves. In some examples, the piezoelectric valves have a small form factor that is less than 20 mm or 10 mm to allow tight packaging of the valves in a valve block of a gas box described further below.

Additional information relating to various types of MEMS Coriolis flow sensors can be found in "Micro-MEMS Coriolis flow sensor with Integrated Capacitive Readout", J. Haneveld, T. S. J. Lammerink, M. J. de Boer and R. J. Wiegerink, 978-1-4244-2978-3/09 I.E.E.E. Transactions of Industrial Electronics (2009) and "Coriolis Flow, Density and Temperature Sensing with a Single Vacuum Sealed MEMS Chip", D. Sparks, R. Smith, S. Massoud-Ansari, and N. Najafi, Solid-State Sensor, Actuator and Microsystems Workshop (2004), both of which are hereby incorporated herein by reference in their entirety.

Referring now to FIG. 1, an example substrate processing system 120 is shown. While a processing chamber for etching, chemical vapor deposition or atomic layer deposition (ALD) using capacitively coupled plasma (CCP) is shown, the MFC with MEMs Coriolis described herein can be used to sense mass flow rate and/or density of fluids in any other type of substrate processing systems. For example, the flow sensors described herein can be used in substrate processing systems using remote plasma or inductively coupled plasma (ICP). Additionally, substrate processing systems can be used in any other semiconductor equipment requiring precise mass flow control and/or density measurements at low flow rates such as spin chucks, etching systems, deposition systems, etc.

The substrate processing system 120 includes a processing chamber 122 that encloses other components of the substrate processing system 120 and contains the RF plasma (if used). The substrate processing system 120 includes an upper electrode 124 and an electrostatic chuck (ESC) 126 or other substrate support. During operation, a substrate 128 is arranged on the ESC 126.

For example only, the upper electrode 124 may include a gas distribution device 129 such as a showerhead that introduces and distributes process gases. The gas distribution device 129 may include a stem portion including one end connected to a top surface of the processing chamber. A base portion is generally cylindrical and extends radially outwardly from an opposite end of the stem portion at a location that is spaced from the top surface of the processing chamber. A substrate-facing surface or faceplate of the base portion of the showerhead includes a plurality of holes through which precursor, reactants, etch gases, inert gases, carrier gases, other process gases or purge gas flows. Alternately, the upper electrode 124 may include a conducting plate and the process gases may be introduced in another manner.

The ESC 126 includes a baseplate 130 that acts as a lower electrode. The baseplate 130 supports a heating plate 132, which may correspond to a ceramic multi-zone heating plate. A thermal resistance layer 134 may be arranged between the heating plate 132 and the baseplate 130. The baseplate 130 may include one or more channels 136 for flowing coolant through the baseplate 130.

If plasma is used, an RF generating system 140 generates and outputs an RF voltage to one of the upper electrode 124 and the lower electrode (e.g., the baseplate 130 of the ESC 126). The other one of the upper electrode 124 and the baseplate 130 may be DC grounded, AC grounded or floating. For example only, the RF generating system 140 may include an RF generator 142 that generates RF power that is fed by a matching and distribution network 144 to the upper electrode 124 or the baseplate 130. In other examples, the plasma may be generated inductively or remotely.

A gas delivery system 150 includes one or more gas sources 152-1, 152-2, . . . , and 152-N (collectively gas sources 152), where N is an integer greater than zero. The gas sources 152 are connected by valves 154-1, 154-2, . . . , and 154-N (collectively valves 154) and MFCs 156-1, 156-2, . . . , and 156-N (collectively MFCs 156) to a manifold 160. While a single gas delivery system 150 is shown, two or more gas delivery systems can be used.

A temperature controller 163 may be connected to a plurality of thermal control elements (TCEs) 164 arranged in the heating plate 132. The temperature controller 163 may be used to control the plurality of TCEs 164 to control a temperature of the ESC 126 and the substrate 128. The temperature controller 163 may communicate with a coolant assembly 166 to control coolant flow through the channels 136. For example, the coolant assembly 166 may include a coolant pump, a reservoir and/or one or more temperature sensors. The temperature controller 163 operates the coolant assembly 166 to selectively flow the coolant through the channels 136 to cool the ESC 126.

A valve 170 and pump 172 may be used to evacuate reactants from the processing chamber 122. A system controller 180 may be used to control components of the substrate processing system 120.

Referring now to FIGS. 2A-2C, an example of the MFC 156-1 is shown. In FIG. 2A, the MFC 156-1 includes a MEMS Coriolis flow sensor 200, a valve 204, and a controller 208. The controller 208 receives a desired flow rate signal from the system controller 180 or other system component. The controller 208 receives a measured flow rate from the MEMS Coriolis flow sensor 200. The controller 208 adjusts the position of the valve 204 based on the measured flow rate to provide the desired mass flow rate. In some examples, the controller 208 uses a proportional, integral derivative (PID) based control.

In FIG. 2B, a bottom surface 238 of the MEMS Coriolis flow sensor 200 is shown attached to an upper surface 240 of a mounting block 242. An internal passage 254 formed in the mounting block 242 delivers fluid to an inlet 250 of the MEMS Coriolis flow sensor 200. An outlet (not shown) of the MEMS Coriolis flow sensor 200 is connected to another internal passage (not shown). In some examples, the bottom surface 238 of the MEMS Coriolis flow sensor 200 is bonded to the upper surface 240 of the mounting block 242 using a bonding material. In some examples, the bonding material includes silicon (Si), silicon dioxide ($SiO_2$), silicon nitride (SiN), borosilicate glass, glass frit, quartz, and/or metal. In some examples, the mounting block 242 is made of material such as steel, ceramic, glass or semiconductor material.

In FIG. 2C, the MEMS Coriolis flow sensor 200 is shown in further detail. In some examples, the MEMS Coriolis flow sensor 200 includes an accelerometer 256 to measure acceleration, movement, vibration, orientation or state of the MEMS Coriolis flow sensor 200. The MEMS Coriolis flow sensor 200 may further include one or more heaters 258 such as resistive heaters to perform localized heating of various locations or zones of the MEMS Coriolis flow sensor 200.

The MEMS Coriolis flow sensor 200 includes a semiconductor substrate 201 defining an inlet 260 that is connected by an internal passage 262. A tube 264 extends from the semiconductor substrate 201 and is made of a semiconductor material. An outlet of the tube 264 is connected by an internal passage 268 to the outlet 270 of the MEMS Coriolis flow sensor 200. The MEMS Coriolis flow sensor 200 further includes a plurality of external pads or contacts 272 that are connected to a MFC control circuit 280 using bond wires, pins, conductors, and/or PCB traces (all not shown) or other type of connection.

The MFC control circuit 280 includes an actuator circuit 284 and a readout circuit 288. The actuator circuit 284 generates an output signal to vibrate the tube 264 at a resonant frequency of the tube 264. For example, the actuator circuit 284 creates electrostatic force that vibrates the tube 264. The readout circuit 288 is connected to a sensing circuit 274 to sense movement and/or twisting of the tube 264, changes in the resonant frequency of the tube 264 and/or phase shift or time lag. In some examples, the sensing circuit 274 includes a capacitive sensing circuit. The MFC control circuit 280 may further include a heater driver circuit 290 to drive the one or more heaters 258 located on the MEMS Coriolis flow sensor 200. A temperature sensor (FIG. 12A) may be arranged in the MEMS Coriolis flow sensor 200 to sense a temperature of the MEMS Coriolis flow sensor and/or gases flowing therethrough.

Referring now to FIG. 3, another example of the MFC 156-1 is shown with an absolute flow verifier (AFV) 300. The MFC 156-1 includes the MEMS Coriolis flow sensor 200, the valve 204, and the controller 208. The AFV 300 further includes a precision orifice 320 and a pressure sensor 324. The precision orifice 320 is considered "precise" if the orifice has a predetermined known size and shape and is unobstructed. The pressure sensor 324 senses pressure upstream from the precision orifice 320 when the precision orifice is operated in choked flow condition. The choked flow condition occurs when gases exit the precision orifice at sonic velocity.

The system controller 208 further includes a lookup table (LUT) 328 or a uses a mathematical relationship to calculate the flow rate as a function of the gas and the upstream pressure. The LUT 328 stores a relationship between pressure at the inlet of the precision orifice (when operating at choked flow conditions) and flow rate. The LUT table 328 may further be accessed by the type of gas that is flowing through and being measured by the MFC 156-1.

The controller 208 receives a desired flow rate signal from the system controller 180 or other system component. The controller 208 receives a measured flow rate from the MEMS Coriolis flow sensor 200. The controller 208 adjusts the position of the valve 204 based on the measured flow rate to provide the desired mass flow rate.

During AFV, the controller 208 receives the pressure measurement from the pressure sensor 324. Given the controller 208 knows the gas that is being delivered, the controller 208 accesses the LUT 328 and determines the flow rate based on the upstream pressure. The controller 208 compares the desired mass flow rate with the AFV flow rate and generates a flow error. In some examples, the flow error is calculated by determining (a difference between the flow rate measured by the MFC minus the flow rate measured by the AFV)/the flow rate measured by the MFC. In some examples, the controller 208 adjusts operation of the MFC 156-1 based on the flow error. Additional details relating to AFV can be found in commonly-assigned U.S. Pat. No. 7,822,570, which issued on Oct. 26, 2010 and is entitled "Methods for Performing Actual Flow Verification", which is hereby incorporated by reference in its entirety.

Referring now to FIG. 4, a method for performing absolute flow verification (AFV) using the system in FIG. 3 is shown. At 402, a mass flow rate of gas flowing through the MEMS Coriolis flow sensor is measured using the MEMS Coriolis flow sensor. At 406, gas flows through a precision orifice operating in a choked flow condition. In some examples, a valve can be used to divert the flow when AFV is desired. At 410, pressure upstream from the precision orifice is measured using a pressure sensor. At 414, the flow rate is determined based on the measured pressure and the gas that is flowing. At 416, a flow rate error is determined. In some examples, the flow rate error is a ratio of (the difference between the flow rate measured by the MEMS Coriolis flow sensor minus the flow measured by the AFV) divided by the flow rate measured by the MEMS Coriolis flow sensor. At 418, a mass flow rate of the MEMS Coriolis flow sensor is adjusted based on the flow rate error. For example, if the flow rate has a +5% error, the MEMS Coriolis flow sensor adjusts the reading by −5%. In some examples, the AFV measurement can be performed during normal operation, while the gas is diverted or during a calibration procedure.

Figure 5:
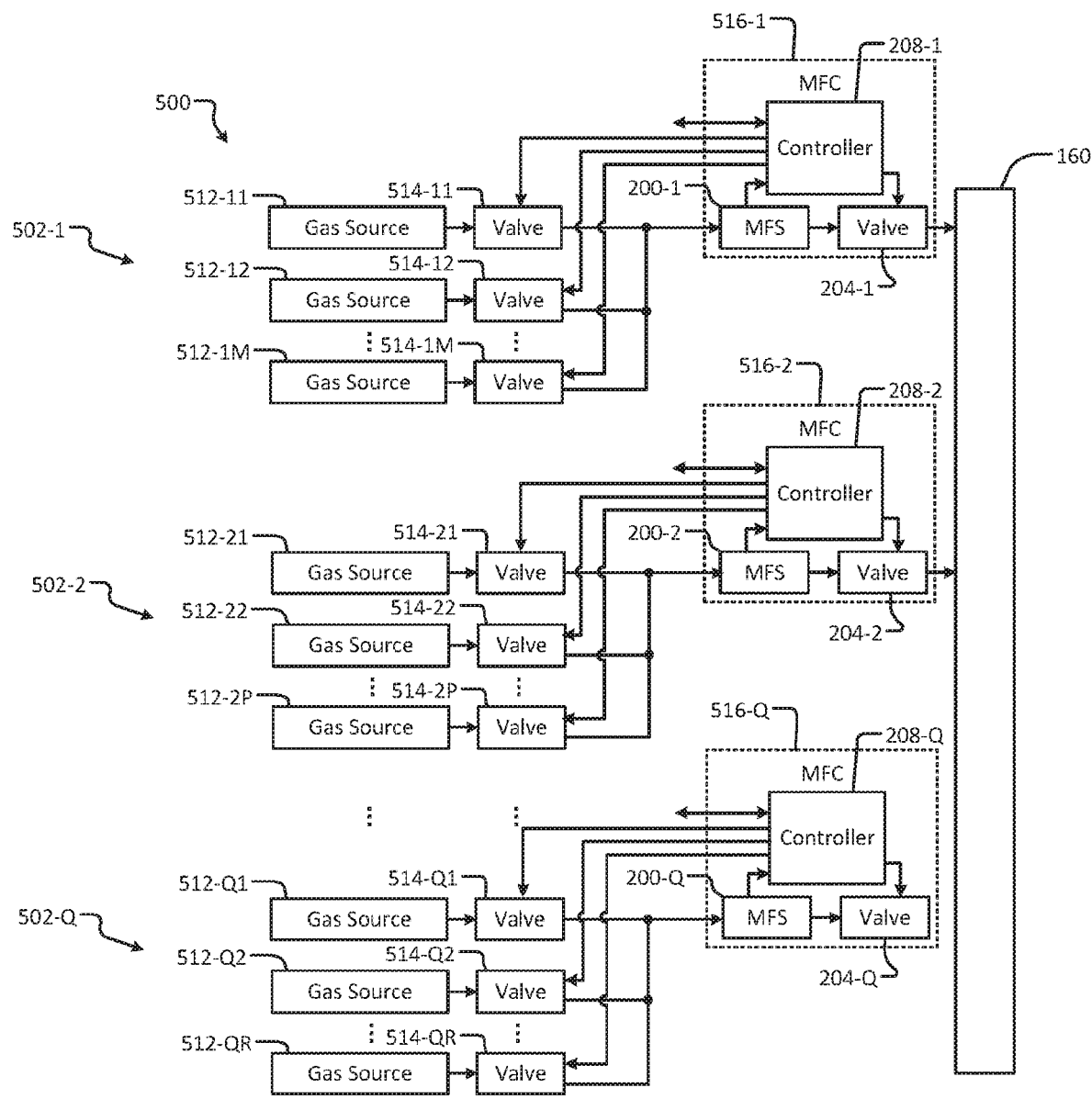
FIG. 5 is a functional block diagram of a gas delivery system including multiplexed MFCs with MEMS Coriolis flow sensors according to the present disclosure.

Referring now to FIG. 5, a gas delivery system 500 including multiplexed MFCs with MEMS Coriolis flow sensors is shown. A typical gas box may include a large number of gas sources that are selectively delivered to the processing chamber. For example, some gas boxes include 16 or 22 different gas sources and/or gas mixtures that can be delivered. Typically, however, a recipe will use 6 or fewer gases at a time. In some examples, 6 gas groups are used although additional or fewer gas groups can be used. According to the present disclosure, the gas sources in a gas box are grouped into a plurality of gas groups each with similar or compatible types of gases. For example, no more than one reactive gas is supplied per gas group. Multiple inert gases can be supplied using a single MFC group or spread out over several MFC groups. For example, molecular nitrogen ($N_2$), sulfur hexafluoride ($SF_6$), tetrafluoromethane ($CF_4$) and argon (Ar) can be supplied in one MFC group. The arrangement of the gases into gas groups will depend upon the application and the particular gases that are to be used. One gas from each group of gases is delivered using a single MFC. As can be appreciated, the cost of the gas box is reduced significantly due to less plumbing and a higher ratio (>=2:1) of gas sources to MFCs (e.g. fewer than 1 gas source to 1 MFC).

In FIG. 5, a gas delivery system 500 includes a plurality of gas groups 502-1, 502-2, . . . 502-Q (collectively gas groups 502) (where Q is greater than one). The gas group 502-1 includes gas sources 512-11, 512-12, . . . and 512-1M (collectively gas sources 512-1) (where M is an integer greater than one). Each of the gas sources 512-1 is output to a valve 514-11, 514-12, . . . and 514-1M (collectively valves 514-1). The valves 514-1 are used to turn the gases on and off. Outputs of all of the valves 514-1 are combined at a gas node and fed to an inlet of the MEMS Coriolis flow sensor 200-1. The controller 208-1 selects the gas to be output at a given time by using the valves 514-1, measures the flow rate of the selected gas, and controls the corresponding valve 204-1 to adjust the mass flow rate to a desired value.

The gas group 502-2 includes gas sources 512-21, 512-22, . . . and 512-2P (collectively gas sources 512-2) (where P is an integer greater than one and where P=M or P< >M). Each of the gas sources 512-2 is output to a valve 514-21, 514-22, . . . and 514-2P (collectively valves 514-2). Outputs of all of the valves 514-2 are combined and fed to the MEMS Coriolis flow sensor 200-2. The controller 208-2 selects the gas to be output at a given time using the valves 514-2, measures the flow rate of the selected gas, and controls the valve 204-2 to adjust the flow rate to a desired value.

Likewise, the gas group 502-Q includes gas sources 512-Q1, 512-Q2, . . . and 512-QR (collectively gas sources 512-Q) (where R is an integer greater than one and where Q=P or Q< >P). Each of the gas sources 512-Q is output to a valve 514-Q1, 514-Q2, . . . and 514-QR (collectively valves 514-Q). Outputs of all of the valves 514-Q are combined and fed to the MEMS Coriolis flow sensor 200-Q. The controller 208-Q selects the gas to be output at a given time, measures the flow rate of the selected gas, and controls the valve 204-Q to adjust the flow rate to a desired value.

In some examples, zero or one gas is selected from each of the gas groups 502-1, . . . , and 502-Q. In other examples, two gases are selected from each of the gas groups 502-1, . . . , and 502-Q and mixed at the node prior to measurement. Outputs of each of the gas groups 502-1, . . . , and 502-Q are delivered to the manifold 160 to create a process gas mixture. As can be appreciated, the cost of the gas box can be significantly reduced due to fewer MFCs and less complex plumbing (due to combining of the gas flow passages prior to mass flow measurement).

Figure 6:
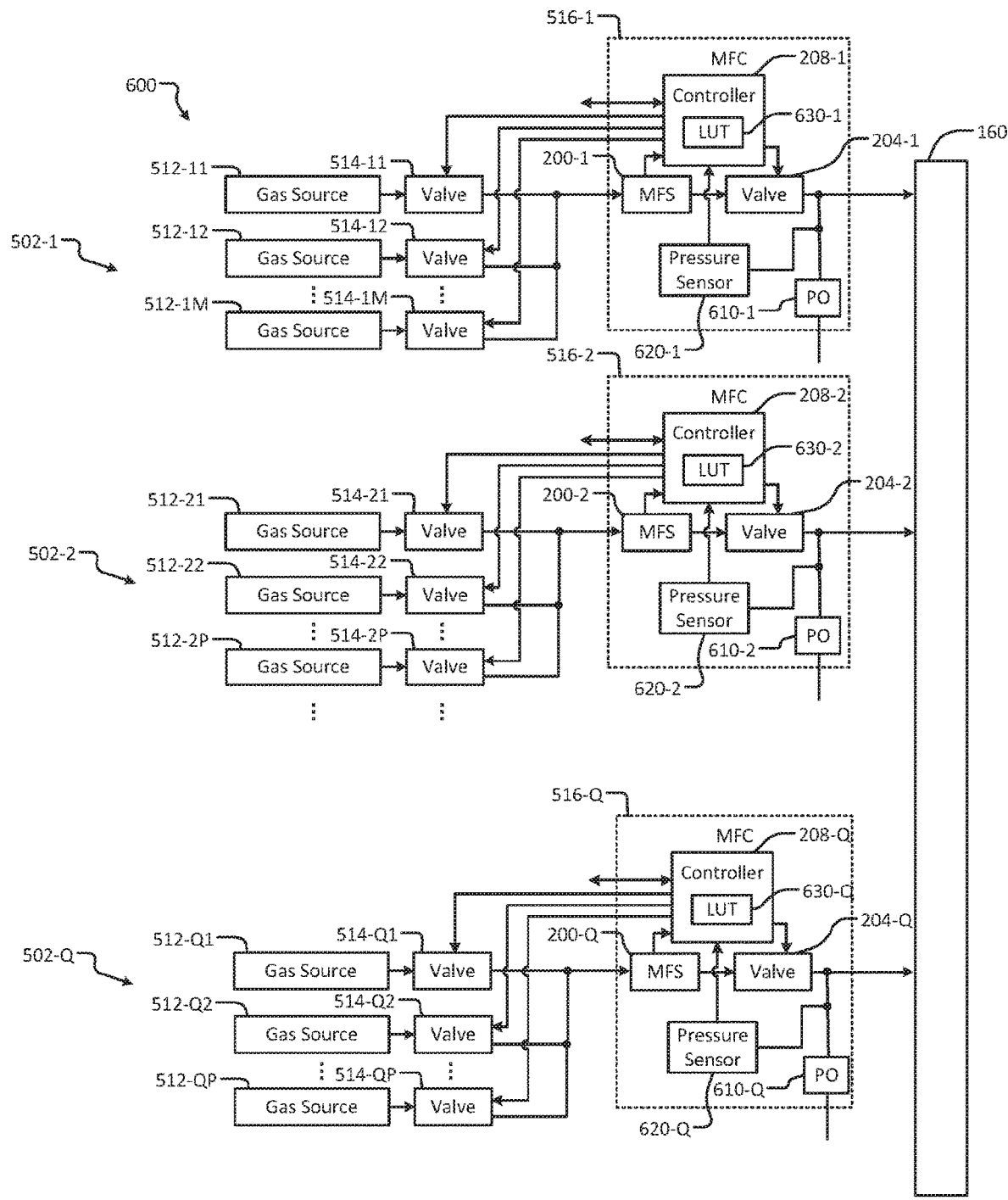
FIG. 6 is a functional block diagram of a gas delivery system including multiplexed MFCs with MEMS Coriolis flow sensors according to the present disclosure.

Referring now to FIG. 6, a gas delivery system 600 including multiplexed MFCs including MEM MEMS Coriolis flow sensors is shown. The gas delivery system 600 further includes precision orifices 610-1, 610-2, . . . , and 610-Q (collectively precision orifices 610) and pressure sensors 620-1, 620-2, . . . , and 620-Q (collectively pressure sensors 620) located upstream from the precision orifices 610. Each of the controllers 208-1, 208-2, . . . , and 208-Q includes a lookup table (LUT) 630-1, 630-2, . . . , and 630-Q or a module to implement a mathematical formula. As can be appreciated, the controllers 208-1, 208-2, . . . , and 208-Q control the valves based on the desired mass flow rate, the measured mass flow rate and the flow rate error calculated using AFV.

Figure 7:
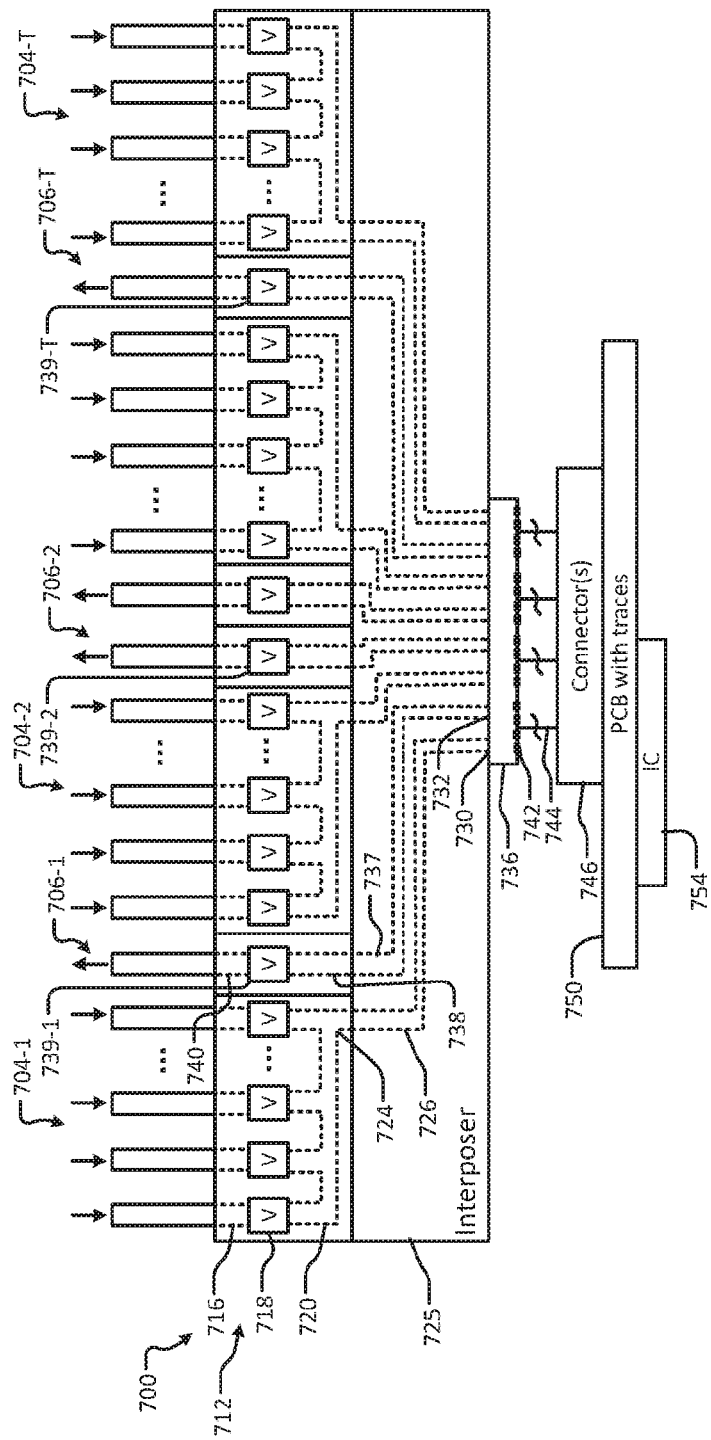
FIG. 7 is a functional block diagram of an example of a multiplexed MFC and an interposer block according to the present disclosure.

Referring now FIG. 7, a multiplexed MFC 700 including an interposer block is shown. The multiplexed MFC 700 includes T groups of inlet tubes 704-1, 704-2, . . . , 704-T (collectively inlet tubes 704) and outlet tubes 706-1, 706-2, . . . , 706-T (collectively outlet tubes 706) for each multiplexed MFC (where T is an integer greater than one). The group of inlet tubes 704-1 and the corresponding outlet tube 706-1 are connected to a valve block 712. In some examples, the valve block 712 is made of stainless steel, ceramic, or other material.

Internal passages 716 defined in the valve block 712 connect each tube of the group of inlet tubes 704 to inlets of corresponding valves 718. The valves 718 operate as on/off valves for the corresponding gas or gas mixture. Outlets of the valves 718 for each of the groups of inlet tubes 704 are connected by internal passages 720 to a common node or junction 724, which may be arranged in the valve block 712 or in an interposer block 725 described further below.

The internal passages 720 connect at a node or junction 724 and then flow through internal passage 726 in the interposer block 725 to an inlet 730 of one of a plurality of MEMS Coriolis flow sensors 736. In some examples, the valve block 712 is bonded to the interposer block 725 using the methods described above. In some examples, "C"-seals are used to create a seal between the valve block 712 and the interposer block 725.

Internal passages 737 in the interposer block 725 are connected to outlets 732 of the MEMS Coriolis flow sensors 736. Internal passages 738 in the valve block 712 connect the internal passages 737 to inlets of valves 739-1, 739-2, . . . , and 739-T (collectively valves 739). The valves 739 are variable valves that are used by the controller to control the flow rate of the gas through the MEMS Coriolis flow sensor 736. Internal passages 740 in the valve block 712 are connected to the outlet tubes 706.

In some examples, all of the MEMS Coriolis flow sensors 736 are integrated onto a single die. In other examples, the MEMS Coriolis flow sensors are diced and individually packaged. Pads or terminals 742 on the MEMS Coriolis flow sensors 736 are connected by bond wires 744 (that may be soldered thereto) and/or one or more connectors 746 to traces (not shown) of a printed circuit board (PCB) 750. One or more control circuits 754 are connected to the PCB 750. In some examples, the control circuits 754 include one or more integrated circuits each including a processor, memory and a control program.

Referring now FIGS. 8A to 8C, another example of a multiplexed MFC 800 is shown. In FIG. 7, the groups of inlet tubes such as 704-1 are arranged adjacent to the corresponding outlet tube such as 706-1. In FIG. 8A, however, the groups of inlet tubes 704-1, . . . and 704-1 are arranged next to each other (at the left in FIG. 8A) and the outlet tubes such as 706-1, . . . , and 706-1 are arranged adjacent to each other (at the right in FIG. 8A). The interposer block 725 in FIG. 7 routes gases in a single layer while an interposer block 825 in FIG. 8A includes multiple gas routing layers and interconnecting vias. While the interposer block 825 includes two layers in FIG. 8A, additional layers can be used.

In FIGS. 8B and 8C, the interposer block 825 includes vias 830 that direct gases from inlet tubes such as 704-1 to internal passages 850, 860 and 862 in a lower layer (848 or 870 in FIGS. 8B and 8C) of the interposer block 825. Vias 834 direct gases from the internal passages 850, 860 and 862 in the lower layer 848 or 870 of the interposer block 825 back to the inlet 730 of one of the MEMS Coriolis flow sensors 736. Internal passages 835 connect outlets 732 of each of the MEMS Coriolis flow sensors 736 to corresponding outlet tubes 706.

As can be seen in FIG. 8C, the lengths of the internal passages 850, 860 and 862 can be varied to equalize distances from the valves 718 to the inlets 730 of the MEMS Coriolis flow sensor 736. Likewise, the positions of the valves 718 can be varied in the valve block 712 (e.g. up and down in FIG. 8A) as needed to further equalize flow path lengths.

Referring now FIGS. 9A to 9C, another example of a MFC 900 including an interposer block 930 is shown. While the preceding examples show multiplexing of MFCs with a ratio of 2:1 or greater, a 1:1 ratio may be used with each gas source being associated with an MFC. In FIG. 9A, an inlet tube 904 is connected by internal passage 906 in a valve block 912 to a valve 908. An outlet of the valve 908 is coupled by internal passage 910 to an inlet of an internal passage 924 of the interposer block 930. The internal passage 924 is connected to an inlet of a MEMS Coriolis flow sensor 736.

In FIG. 9B, an outlet 732 of the MEMS Coriolis flow sensor 736 is connected by a via 936 to an internal passage 942 in a lower layer 940 of the interposer block 930. A via 944 connects the internal passage 942 from the lower layer 940 to an internal passage 948 of the valve block 912. The internal passage 948 is connected to an inlet of a valve 950. An outlet of the valve 950 is connected by an internal passage 952 in the valve block 912 to an outlet tube 954. Other inlet tubes are connected to adjacent outlet tubes in a similar fashion.

In FIG. 9C, an outlet of the MEMS Coriolis flow sensor 736 is connected by a via 936 to an internal passage 962 in a lower layer 960 of the interposer block 930. As can be appreciated, while the internal passages in the preceding examples defined straight-line connections in x-y directions, the internal passages can also have some diagonal paths as shown at 962. The via 944 connects the internal passage 962 to an internal passage 948 of the valve block 912.

Figure 10:
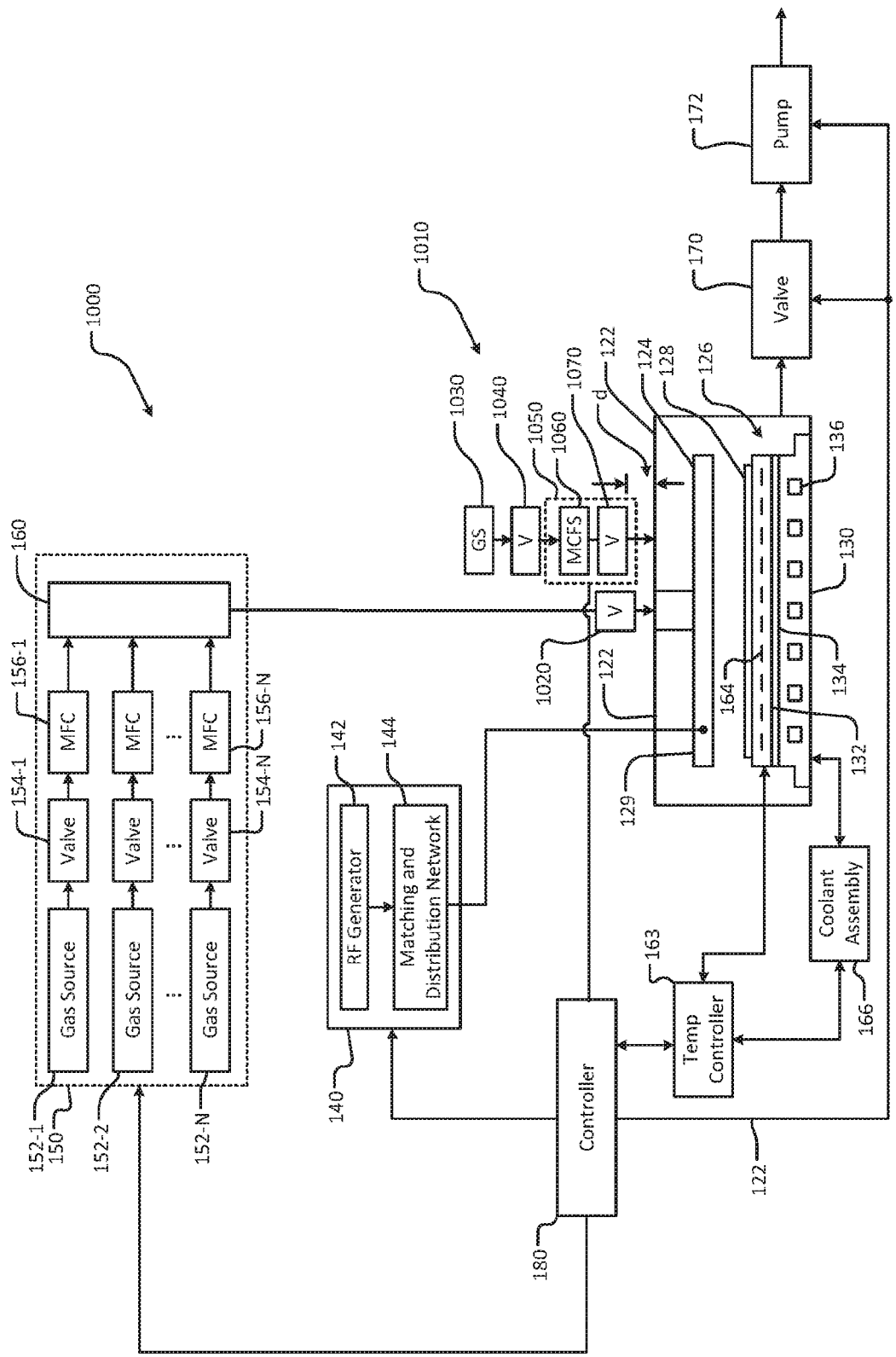
FIG. 10 is a valve block diagram of an example of a substrate processing system including one or more valves arranged immediately adjacent to the processing chamber for delivering gases according to the present disclosure.

Referring now FIG. 10, a substrate processing system 1000 including an additional gas delivery system 1010 for injecting or pulsing gases for short intervals (e.g. less than 10 seconds, 5 seconds, 2 seconds or 1 second) immediately adjacent to the processing chamber is shown. For example, the additional gas delivery system 1010 delivers pulsed gases using a valve having an outlet within a predetermined distance d of the processing chamber. In some examples, the distance d is less than 10 inches. In other examples, the distance d is less than 5-6 inches.

For applications such as atomic layer deposition (ALD) and atomic layer etching (ALE), gases are pulsed quickly during very short intervals to deposit or etch about a monolayer of film. The transport time of gases from the manifold 160 to the processing chamber 12 can be relatively long. For example, the transport distance may be on the order of 10 feet from the manifold 162 the gas distribution device 129 (such as the showerhead). To reduce this problem, some substrate processing systems locate a valve 1022 after the manifold 160 next to the processing chamber 122 to trap gases between the outlet of the manifold 160 and the delivery location near the processing chamber. When the pulse duration is very short, the transport distance should be reduced significantly.

The additional gas delivery system 1010 includes a gas source 1030, a valve 1040, and a MFC 1050 including a MEMS Coriolis flow sensor (MCFS) 1060 and a valve 1070. An outlet of the valve 1070 is located within the predetermined distance d from the chamber. As can be appreciated, the reduced transport distance significantly improves the response time during pulsed gas delivery. In some examples, the valve 1020 may be omitted when the additional gas delivery system 1010 is used to deliver pulsed gases. While a single gas channel for delivering a single pulsed gas is shown, additional gas sources and channels having a similar structure and different gases may be provided. In some examples, the MFC can be multiplexed for multiple pulsed gas sources as described above. In some examples, AFV can also be used to verify flows of the pulsed gases as described above. In some examples, molecular oxygen (02) is supplied, although other gas may be used.

Figure 11A:
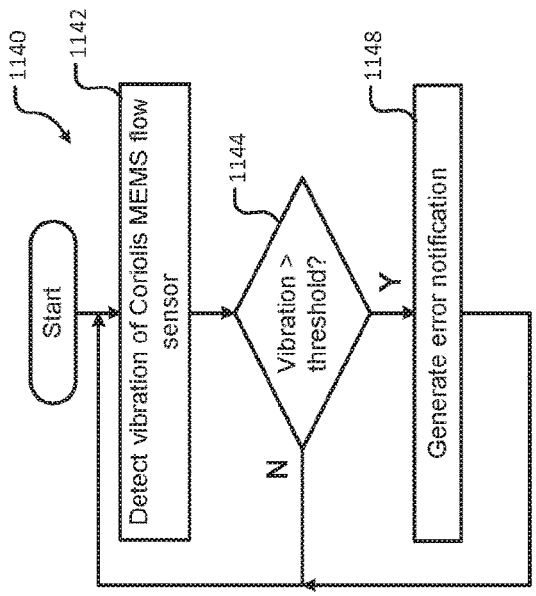
FIG. 11A is a functional block diagram of an example of an MFC control circuit including an acceleration control circuit to adjust operation of the MFC based on an orientation or state of the MFC, detected vibration of the MEMS Coriolis flow sensor or other parameters.

Referring now to FIG. 11A, a system 1100 includes a MFC control circuit 1120 with an acceleration control circuit 1124 to adjust operation based on acceleration, vibration, orientation, state or other parameters or conditions detected by an accelerometer 1114 of the MEMS Coriolis flow sensor 1110. The acceleration or vibration measurement can be used in various ways including orientation or state detection and/or detection of environmental vibration. For example, the vibration of the tube can be measured before the tube is vibrated at the resonant frequency to determine a baseline vibration. Then, the tube is vibrated at the resonant frequency and the baseline vibration is subtracted or compensation is performed to mitigate the effect of the baseline vibration.

Figure 11B:
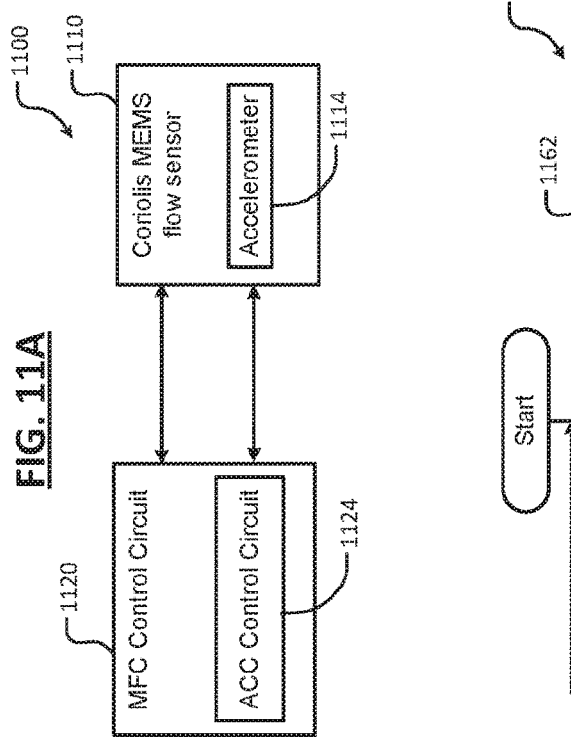
FIGS. 11B and 11C are flowcharts of examples of methods for operating the acceleration control circuit of FIG. 11A.

Referring now to FIGS. 11B and 110, examples of methods for operating the acceleration control circuit of FIG. 11A are shown. In FIG. 11B, a method 1140 is shown for generating error notifications when the vibration detected by the accelerometer 1114 exceeds a predetermined vibration threshold or to perform compensation. In some examples, the vibration threshold corresponds to a frequency of vibration and/or in other examples the predetermined vibration threshold corresponds to a vibration amplitude. At 1142, the method detects vibration of the MEMS Coriolis flow sensor. At 1144, the method determines whether the detected vibration frequency and/or amplitude is greater than a predetermined threshold. If 1144 is true, the acceleration control circuit 1124 generates an error notification or alters operation of the MFC.

Figure 11C:
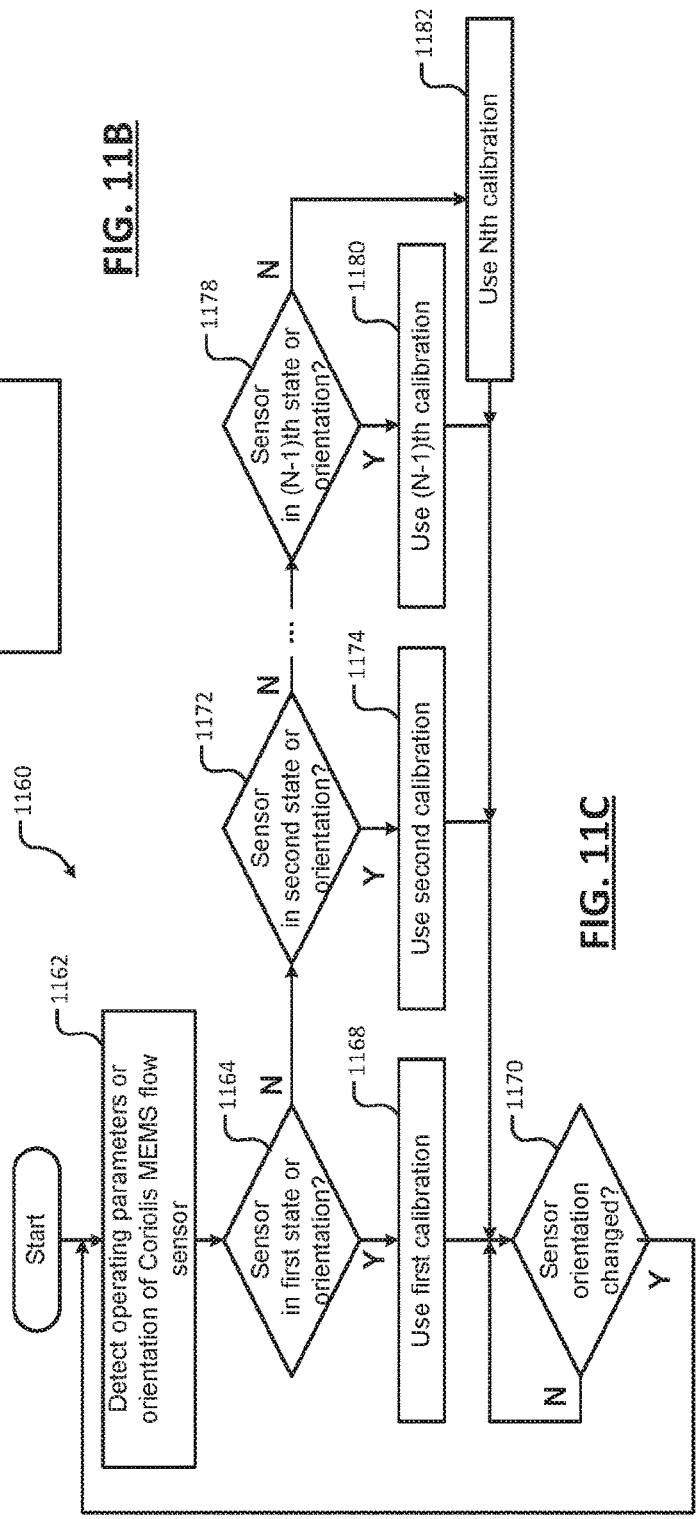

In FIG. 11C, another method 1160 detects orientation, state, acceleration, or other conditions of the MEMS Coriolis flow sensor and selects a calibration based thereon. In some examples, the accelerometer 1114 is used to detect an orientation or state of the MEMS Coriolis flow sensor 1110. In other examples, other sensors sense parameters of the MEMS Coriolis flow sensor 1110, a state of the MEMS Coriolis flow sensor 1110 is determined and a calibration is selected.

At 1162, the method detects the orientation, acceleration, state or other conditions of the MEMS Coriolis flow sensor. At 1164, the method determines whether the sensor is in a first state or orientation. In some examples, the first state corresponds to a first orientation, state, acceleration, vibration or other condition. In some examples, the first state may include a first predetermined range of values. If the sensor is in the first state, the controller uses a first calibration formula or lookup table and/or adjusts weights and/or factors of a formula at 1168. If 1164 is false, the method determines whether the sensor is in a second state. In some examples, the second state may include a second predetermined range of values. If the sensor is in the second state, the controller uses a second calibration formula or lookup table and/or adjusts weights and/or factors of a formula at 1174. Additional states (N−1 and N shown in 1172 and 1174 and/or 1178 and 1180, respectively) can be calibrated. If the state of the MEMS Coriolis flow sensor changes as determined at 1170, the calibration can be repeated by returning to 1162.

For example only, the first state or orientation may correspond to the tube being oriented in a plane parallel to earth with the inlets and outlets located on a bottom surface thereof, the second state or orientation may correspond to the tube being oriented perpendicular to the plane parallel to the earth, and other states or orientations may correspond to orientations therebetween. As can be appreciated, when the tube is arranged perpendicular to earth, gravity, buoyancy and/or other effects may impact vibration of the tube and require compensation. In other examples, operation of the MEMs Coriolis sensor is enabled only when the MEMs Coriolis sensor is in a selected one of the orientations or states.

Figure 12B:
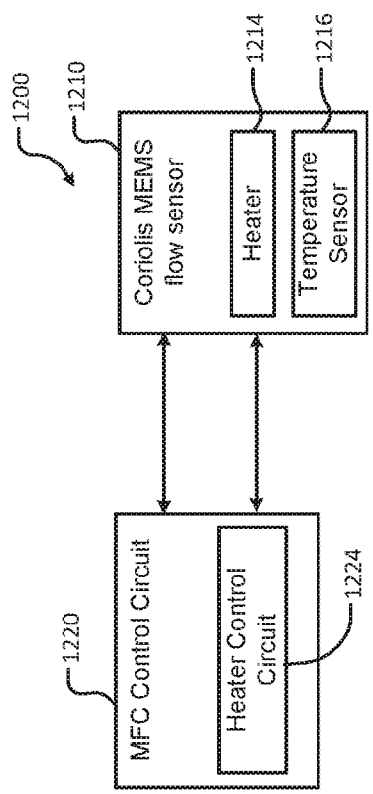
FIG. 12B is a flowchart of an example of a method for heating the MEMS Coriolis flow sensor.
Figure 12A:
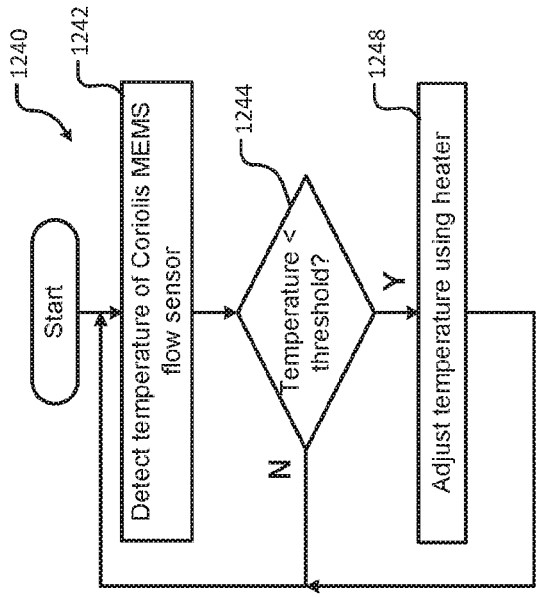
FIG. 12A is a functional block diagram of an example of an MFC control circuit including an heater control circuit to adjust operation based on a temperature of the MEMS Coriolis flow sensor.

Referring now to FIGS. 12A and 12B, a system 1200 for controlling a temperature of the MEMS Coriolis flow sensor 1210 is shown. While heating of the MEMS Coriolis flow sensor 1210 is shown, heating of internal passages and blocks may also be performed after maintenance to prevent corrosion caused by aqueous solutions. Some gases such as chlorine (Cl) species and hydrogen bromide (H Br) may cause erosion when in aqueous form. Water in ambient air can combine with these species to create aqueous solutions.

Therefore, in some examples, heating of the MFC and/or nearby flow paths to a predetermined temperature such as 200° C. is performed for a predetermined period during or after maintenance to prevent corrosion. In some examples, purging of the processing chamber and supply lines is performed using an inert gas after the heating procedure. In some examples, heating of the lines is performed after maintenance procedures such as open chamber, open gas lines and/or bottle changes where internal components of the processing chamber can be exposed to ambient.

In FIG. 12A, the MEMS Coriolis flow sensor 1210 includes a heater 1214 and a temperature sensor 1216. In some examples, the heater 1214 includes a resistive heater. A MFC control circuit 1220 includes a heater control circuit 1224. The heater control circuit 1224 receives temperature measurements corresponding to a temperature of the MEMS Coriolis flow sensor 1210 and/or a temperature of gases flowing through the MEMS Coriolis flow sensor 1210. The heater control circuit 1224 compares the measured temperature to one or more predetermined temperature thresholds. If the temperature of the MEMS Coriolis flow sensor 1210 and/or the temperature of gases flowing through the MEMS Coriolis flow sensor 1210 fall below the predetermined threshold, the heater control circuit 1224 supplies power to the heater 1214 to increase a temperature of the MEMS Coriolis flow sensor 1210 and/or the temperature of gases flowing through the MEMS Coriolis flow sensor 1210. In some examples, the predetermined temperature threshold that is applied is selected based upon the type of gas flowing through the MEMS Coriolis flow sensor 1210. In other examples, the predetermined temperature threshold that is applied is independent of the type of gas flowing through the MEMS Coriolis flow sensor 1210.

In FIG. 12B, a method 1240 for controlling a heater arranged in a MEMS Coriolis flow sensor is shown. At 1242, a temperature of the MEMS Coriolis flow sensor or gases flowing through the MEMS Coriolis flow sensor is detected. At 1244, the temperature is compared to a predetermined threshold. If the temperature is less than the predetermined threshold as determined at 1244, the temperature is adjusted using the heater at 1248. In some examples, hysteresis can be used to prevent the control circuit from turning the heater on and off quickly. In other words, the heater is actuated when the measured temperature falls a predetermined delta temperature below the predetermined temperature threshold.

Figure 13:
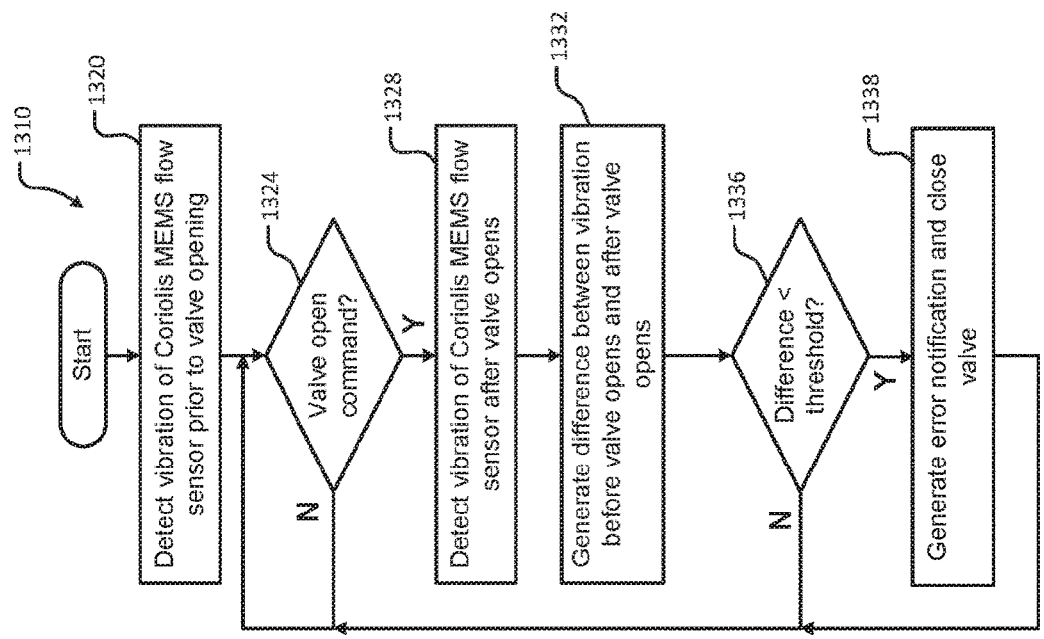
FIG. 13 is a flowchart of an example of a method for detecting whether a valve supplying fluid such as a gas is open based upon sensed vibration of the MEMS Coriolis flow sensor according to the present disclosure.

Referring now to FIG. 13, a method 1310 for detecting whether the valve supplying gas opens or closes correctly based upon changes in vibration of the MEMS Coriolis flow sensor 200 (that are detected using the accelerometer 256). The vibration of the MEMS Coriolis flow sensor 200 is largely due to vibration of the tube at the resonant frequency while the valve is open and gas is flowing during operation. Therefore, changes in vibration of the MEMS Coriolis flow sensor 200 (and in some instances changes in the corresponding operating state) can be used to diagnose operation of the MEMS Coriolis flow sensor 200.

While the method shown in FIG. 13 relates to the valve close/open transition, a similar approach can be used for the valve open/close transition. At 1320, vibration of the MEMS Coriolis flow sensor is detected prior to opening of the valve. At 1324, the method determines whether the valve is opened. At 1328, vibration of the MEMS Coriolis flow sensor is detected after the valve opens. Vibration measurements may include sampling of the vibration frequency and/or magnitude of the MEMS Coriolis flow sensor. Since the valve should be transitioning from a closed state to an open state, vibration of the MEMS Coriolis flow sensor should increase during this state transition. If no change is detected, then further diagnosis of the valve may be performed and/or the processing chamber may be shut down for maintenance. For example, if the vibration levels remain unchanged, either the valve was already open or the valve failed to open.

At 1332, one or more differences are generated between the vibration measurements while the valve should be closed and after the valve should be opened. At 1336, the method determines whether the one or more differences are less than or equal to one or more corresponding thresholds. Alternately, the vibration levels before and/or after the open command can be compared directly to one or more predetermined values or ranges. For example, the vibration level after the open command can be compared to a predetermined value or range corresponding to an open valve to determine whether the valve is indeed open. For example, the vibration level before the open command can be compared to a predetermined value or range corresponding to a closed valve to determine whether the valve is indeed closed.

If 1336 is true, the method generates an error notification at 1338. In some examples, the corresponding valve is optionally closed and/or the processing chamber is shut down for maintenance. As can be appreciated, a similar approach may be used to diagnose operation of the valve when the valve transitions from an open state to a closed state. In other words, vibration may be detected before and after the transition from an open state to a closed state. Vibration should decrease after the open/close transition. Either differences are generated (before and after the open/close transition and compared to thresholds) or the corresponding vibration levels before and after the open/close transition are compared to one or more predetermined thresholds or ranges.

Figure 14:
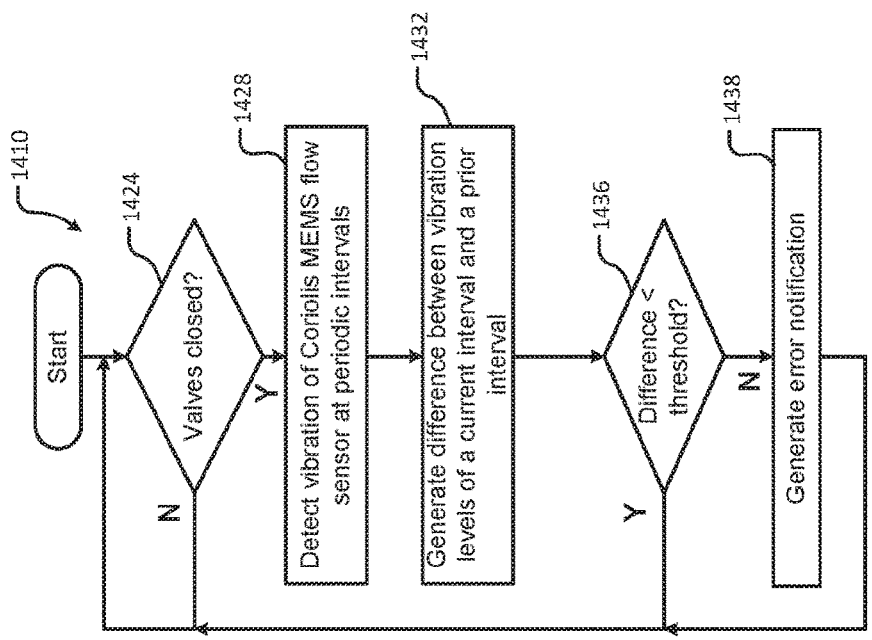
FIG. 14 is a flowchart of an example of a method for detecting whether the valve supplying fluid is closed based upon sensed vibration of the MEMS Coriolis flow sensor according to the present disclosure.

Referring now to FIG. 14, another method 1410 diagnoses valve operation by detecting whether the valve is closed based upon sensed vibration of the MEMS Coriolis flow sensor. More particularly, the vibration level of the MEMS Coriolis flow sensor should remain relatively constant while the valve is closed. Changes to the vibration of the MEMS Coriolis flow sensor while it is closed may be indicative of valve malfunction. The current vibration level can be compared to one or more predetermined thresholds or ranges and/or to one or more prior intervals when the valve was commanded to the closed state.

At 1424, the method determines whether the downstream valve is closed. At 1428, vibration of the MEMS Coriolis flow sensor is detected at periodic intervals or on an event basis. At 1432, one or more differences between vibration levels for two or more intervals (e.g. the current interval and a prior interval) while the valve is closed are generated. For example, vibration is detected for a current interval and compared to a predetermined vibration threshold and/or to vibration levels during one or more prior intervals (when the valve was closed). At 1436, the method determines whether the difference is less than a threshold. Alternately, the method compares the vibration of the current interval to a predetermined vibration threshold or range and proceeds to 1436 if the vibration of the current interval exceeds the predetermined threshold (or is outside of the range). If 1436 is true, the method returns to 1424. If 1436 is false, the method generates an error notification 1438. In some examples, the processing chamber can be shut down in response to the notification. As can be appreciated, changes in vibration can be used to detect anomalous operation of the valves.

Figure 15:
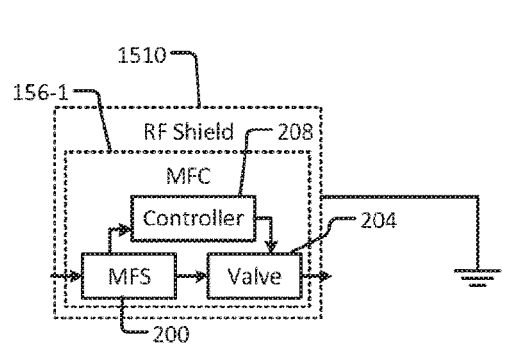
FIG. 15 is a functional block diagram of an example of an MFC including a MEMS Coriolis flow sensor and an RF shield according to the present disclosure.

Referring now to FIG. 15, the MEMS-based MFC with the MEMS Coriolis flow sensor is located in an environment that is often exposed to high RF signals due to plasma generation, pedestal RF bias voltages, temperature control signals for heaters in the substrate support and/or other control or bias signals. Due to the relatively small flows that are being measured, the electronics associated with the controller need to be sensitive and very precise and may be adversely impacted by environmental interference. Accordingly, an RF shield 1510 is arranged around the MFC 156-1 to reduce environmental interference. In some examples, the RF shield 1510 includes a Faraday cage, a metal housing, a wire mesh or other RF shield that is grounded or connected to another reference potential. The RF shield 1510 may be used to reduce the impact of the RF noise on the operation of the MEMS Coriolis flow sensor 200.

Figure 16B:
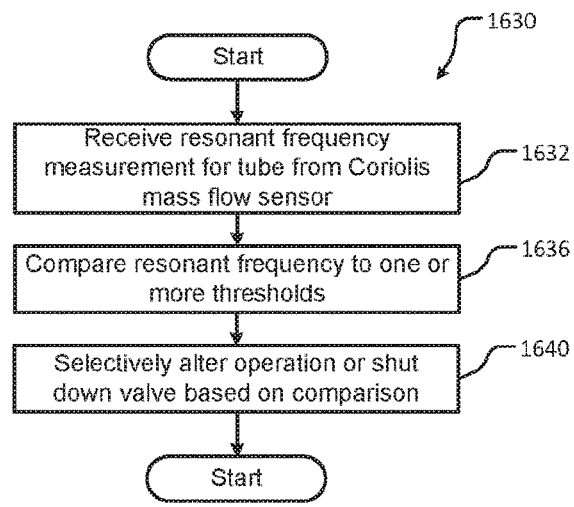
FIG. 16B is a flowchart of an example of a method for monitoring performance of an MFC including a MEMS Coriolis flow sensor based upon the resonant frequency of the tube according to the present disclosure.
Figure 16A:
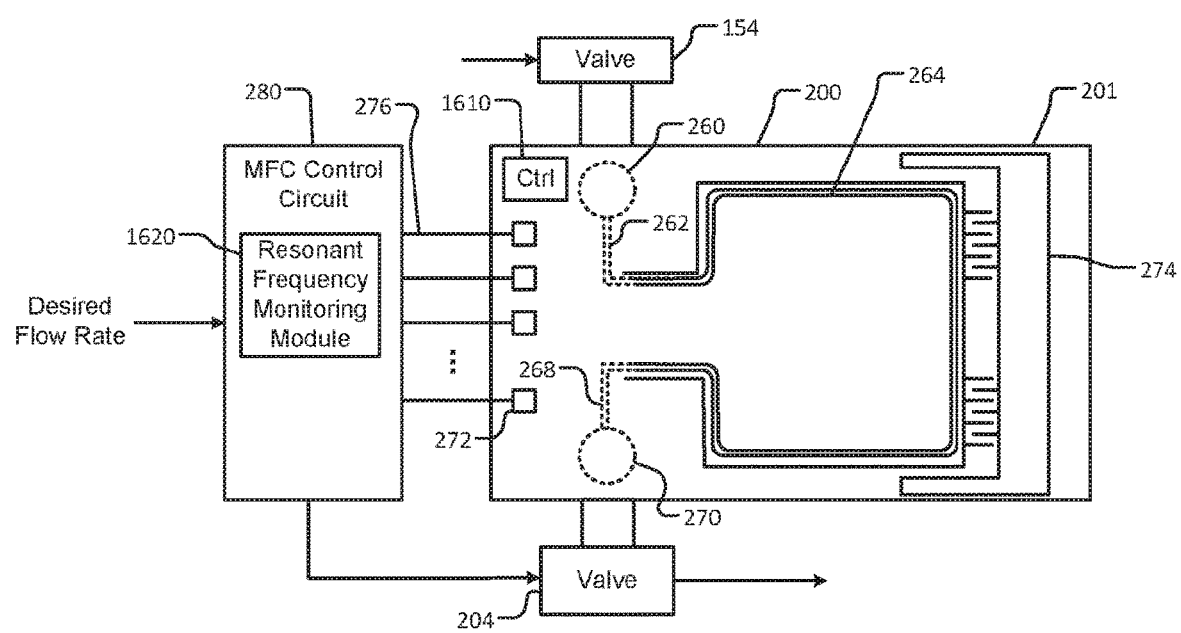
FIG. 16A is a functional block diagram of an example of an MFC including a MEMS Coriolis flow sensor and a resonant frequency monitoring module according to the present disclosure.

Referring now to FIGS. 16A-16B, the resonant frequency of the tube may be monitored to detect operational variations and/or wear. In some examples, the resonant frequency of the tube may be determined based on an amplitude of vibration of the tube. The amplitude of vibration of the tube tends to increase at resonant frequencies of the tube. Alternately, an accelerometer can be used to detect increased vibration. In this example, the MEMS Coriolis flow sensors reports the resonant frequency of the tube to the MFC control circuit 280 and/or other data proportional (or otherwise related) to the resonant frequency. The MEMS Coriolis flow sensors according to the present disclosure output the resonant frequency to a resonant frequency monitoring module in the MFC control circuit 280. The MFC control circuit 280 monitors the resonant frequency of the tube and diagnoses operation of the MEMS Coriolis flow sensor 200 based thereon. For example, changes in the resonant frequency may occur as the stiffness of the tube changes over time. Changes in stiffness of the tube can be used by the resonant frequency monitoring module to initiate maintenance or replacement. In other examples, the resonant frequency monitoring module estimates a future date when maintenance or replacement of the tube (and MEMS Coriolis flow sensor) is needed.

In FIG. 16A, the MEMS Coriolis flow sensor 200 further includes a controller 1610 that monitors a resonant frequency of the tube 264 and that performs other control functions. In some examples, the MFC control circuit 280 receives the resonant frequency of the tube 264 from the MEMS Coriolis flow sensor 200. In other examples, the MFC control circuit 280 determines or calculates the resonant frequency based on other data received from the MEMS Coriolis flow sensor 200. The MFC control circuit 280 further includes a resonant frequency monitoring module 1620. The controller 1610 periodically reports the resonant frequency of the tube 264 (or other related data) to the MFC control circuit 280. The resonant frequency monitoring module 1620 monitors the resonant frequency of the tube over time.

In FIG. 16B, a method 1630 for monitoring the resonant frequency of the tube 264 is shown. At 1632, the resonant frequency of the tube 264 is received from the MEMS Coriolis flow sensor. At 1636, the resonant frequency is compared to one or more resonant frequency thresholds. At 1640, details relating to the operation of the valve and/or MFC can be determined by monitoring the resonant frequency values over time. For example, the comparison may be used to optionally alter operation of the MFC or to allow compensation of the mass flow rate calculation (or calculation of other values).

Figure 17:
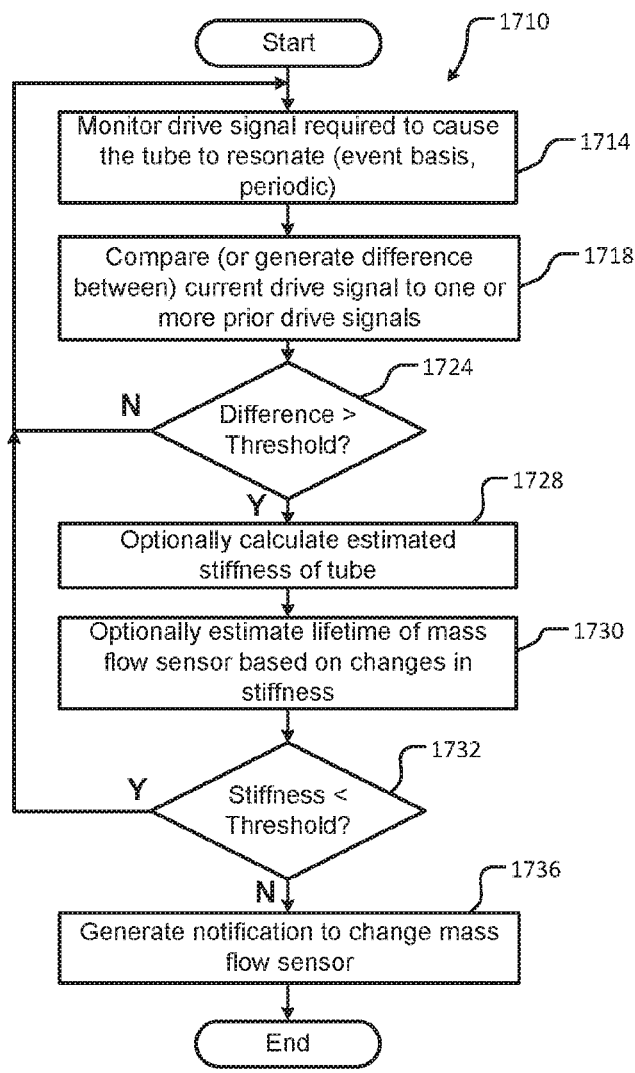
FIG. 17 is a flowchart of an example of a method for monitoring a drive signal for resonating the tube of an MFC including a MEMS Coriolis flow sensor to detect wear and/or other operational changes according to the present disclosure.

In FIG. 17, a method 1710 for monitoring performance of the MEMS Coriolis flow sensor 200 based upon the drive signal output to the resonant tube 264 is shown. As the stiffness of the tube decreases over time, the drive signal may decrease. Therefore, changes in the drive signal may be correlated to the stiffness of the tube. At 1714, a drive signal that is output to vibrate the tube 264 to cause the tube to resonate is monitored on an event basis or on a periodic basis. At 1718, the current drive signal is compared to one or more prior drive signals. At 1724, the method compares the difference to a predetermined threshold. Alternately, the drive signal may be compared to predetermined values or ranges.

At 1728, the estimated stiffness of the tube 264 is optionally calculated. At 1730, the lifetime of the MEMS Coriolis flow sensor 200 is estimated based on changes to the stiffness of the tube over time. At 1732, the estimated stiffness is compared to a threshold. If the stiffness is greater than the threshold, the method returns to 1714. If the stiffness is less than the threshold, the method generates a notification to change the MEMS Coriolis flow sensor (and/or the MFC) at 1736 or provides an estimate of a future date when the MFC is likely ready to be replaced.

Figure 18A:
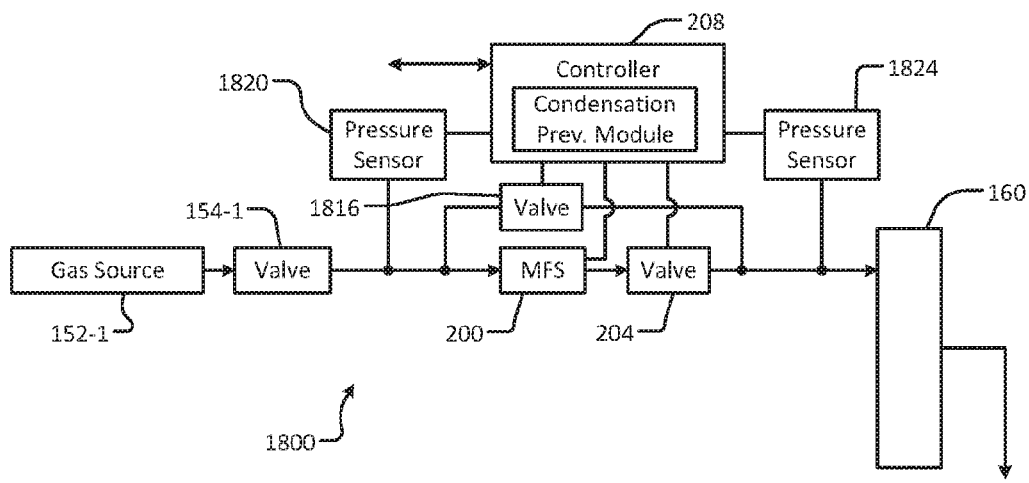
FIGS. 18A and 18B are functional block diagrams of examples of MFCs including a MEMS Coriolis flow sensor that monitor upstream pressure to prevent condensation according to the present disclosure.
Figure 18B:
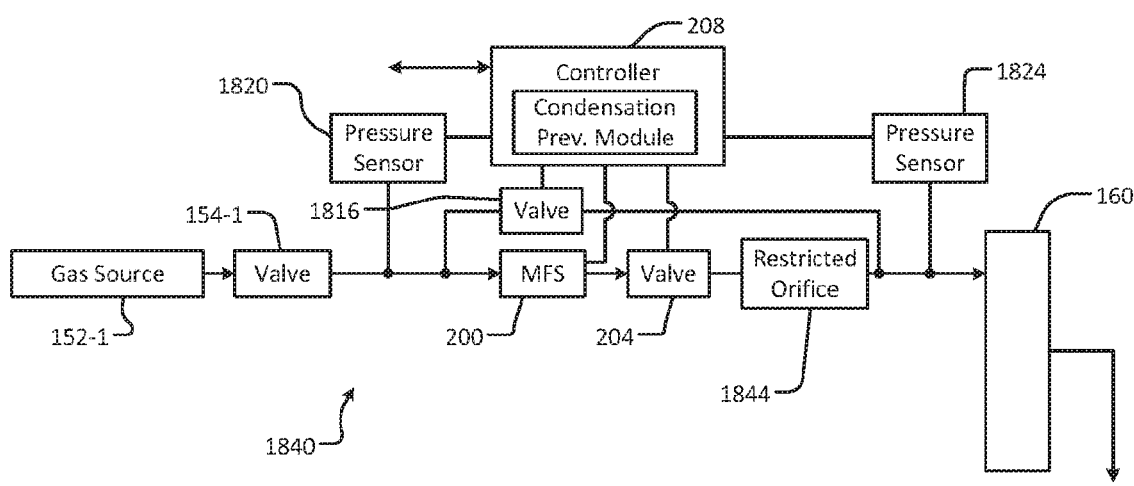

Referring now to FIGS. 18A-18C, upstream pressure can be monitored to prevent condensation of gases entering the MFC. When the pressure of a gas exceeds the vapor pressure of the gas, the gas condenses into liquid. Liquid in the gas lines causes defects and is very difficult to remove. Therefore, the affected components are usually replaced, which increases cost and down time.

When the pressure at the inlet of the MFC is greater than a predetermined pressure (above which condensation is likely to occur), a bypass path may be used to bypass the MFC, which lowers the pressure at the inlet below the condensation pressure. As can be appreciated, the controller of the MFC accounts for the mass flow rate of the bypass path (when the bypass path is open) to determine the total mass flow rate that is delivered.

In FIG. 18A, an MFC 1800 further includes a pressure sensor 1820 arranged upstream of the valve 204 to monitor inlet pressure. A pressure sensor 1824 may be arranged downstream of the valve 154-1 to determine the mass flow rate through the bypass path. In some examples, the valve 204 includes a variable valve, a piezo valve or other type of valve. In FIG. 18B, an MFC 1840 includes the valve 204 and a restricted orifice 1844. In some examples, the valve 204 may include an on/off valve and the restricted orifice 1844 includes a precision orifice.

Referring now to FIG. 18C, a method 1850 for monitoring upstream pressure of an MFC including a MEMS Coriolis flow sensor to prevent condensation is shown. At 1854, the MEMS Coriolis flow sensor is initially operated with a bypass valve closed. The mass flow rate is calculated by the MEMS Coriolis flow sensor. The pressure at an inlet of the MEMS Coriolis flow sensor is monitored at 1858. At 1862, the method determines whether the upstream pressure P1 is greater than a predetermined pressure threshold. If 1862 is false, the method returns to 1854. If 1862 is true, the method continues at 1866 and adjusts the opening of the bypass valve to divert flow and reduce pressure at the inlet of the MEMS Coriolis flow sensor below the pressure threshold. At 1870, the total mass flow rate (when the bypass valve is used) is calculated based on the mass flow rate of the MEMS Coriolis mass flow sensor, valve position, the upstream pressure and/or downstream pressure. As a result, the system can be used with low vapor pressure gases without causing condensation.

Referring now to FIG. 19, liquid fluids can also be delivered by the MEMS-based MFC with the MEMS Coriolis flow sensor. A liquid delivery system 1900 includes a liquid source 1920 that delivers liquid via a valve 1924 to an inlet of a MFC 1928 that includes the MEMS Coriolis flow sensor. An outlet of the MFC 1928 is supplied to a vaporizer 1932, which vaporizes the liquid. The vaporizer 1932 typically includes a heated element (not shown). Liquid supplied to the vaporizer 1932 contacts the heated element and is vaporized.

Figure 20A:
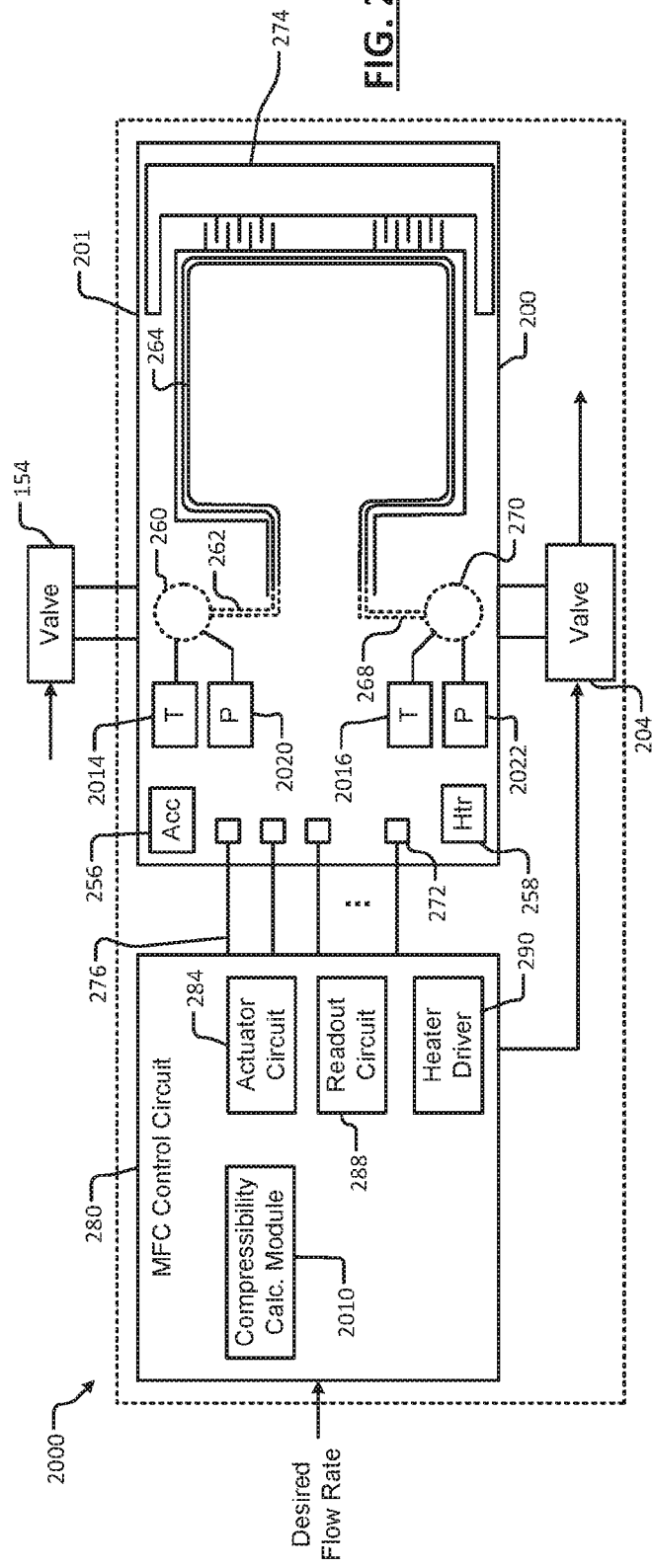
FIG. 20A is a functional block diagram of an example of an MFC including a MEMS Coriolis flow sensor and a compressibility calculating module according to the present disclosure.

Referring now to FIG. 20A, an MFC 2000 includes the MEMS Coriolis flow sensor 200. The MFC control circuit 280 further includes a compressibility calculating module 2010. The MEMS Coriolis flow sensor 200 further includes a first temperature sensor 2014 at the inlet 260 of the MEMS Coriolis flow sensor 200 and a second temperature sensor 2016 at the outlet 270 of the MEMS Coriolis flow sensor 200. The MEMS Coriolis flow sensor 200 further includes a first pressure sensor 2020 at the inlet 260 of the MEMS Coriolis flow sensor 200 and a second pressure sensor 2022 at the outlet 270 of the MEMS Coriolis flow sensor 200. The MEMS Coriolis flow sensor 200 reports the measured temperatures and pressures at the inlet and outlet to the MFC control circuit 280. The MFC control circuit 280 calculates $\Delta T$ and $\Delta P$ and the compressibility (Z) of the gas flowing through the tube 264 using the gas equation of state.

Figure 20B:
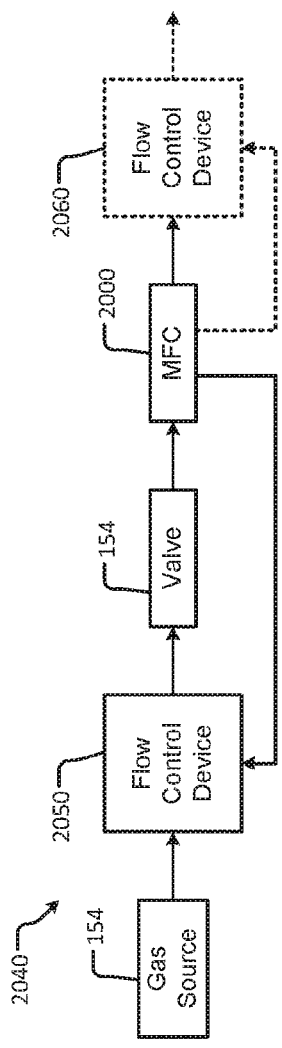
FIG. 20B is a functional block diagram of an example of the system of FIG. 20A outputting the calculated compressibility to upstream and/or downstream flow control devices according to the present disclosure.
Figure 20C:
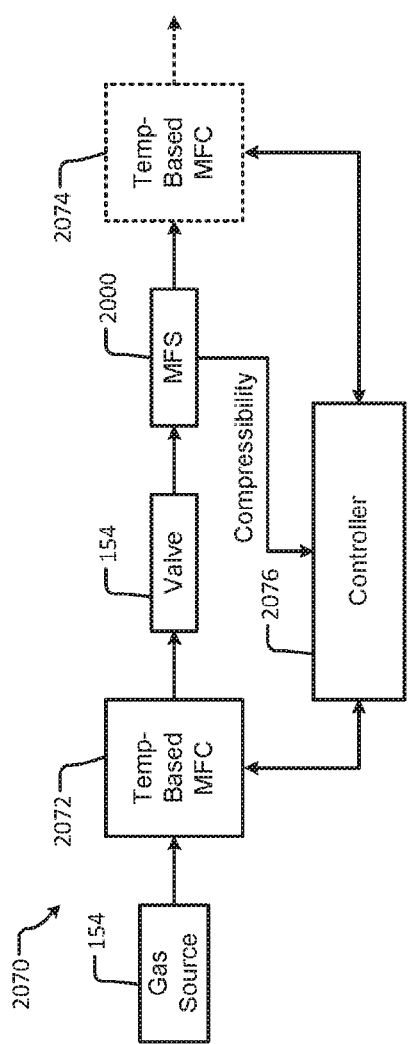
FIG. 20C is a functional block diagram of an example of the system of FIG. 20A outputting the calculated compressibility to an upstream and/or downstream temperature-based MFC according to the present disclosure.
Figure 20D:
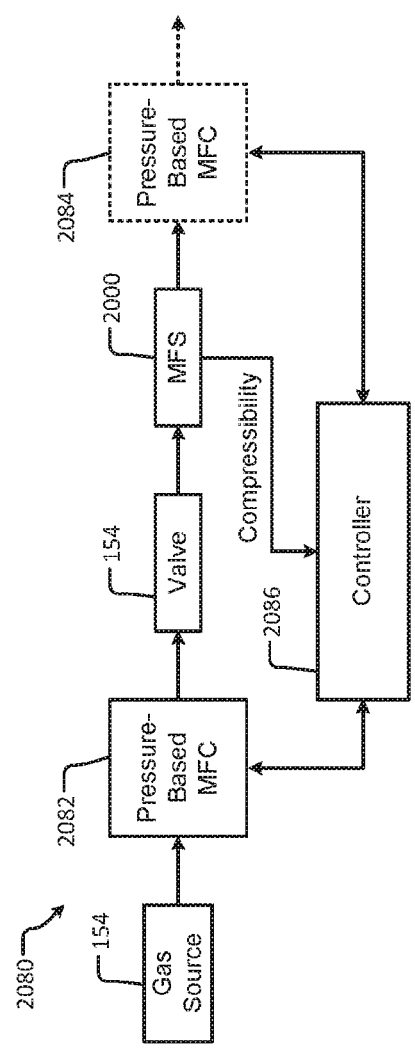
FIG. 20D is a functional block diagram of an example of the system of FIG. 20A outputting the calculated compressibility to an upstream and/or downstream pressure-based MFC according to the present disclosure.

In FIGS. 20B to 20D, various examples for using the compressibility calculated by the MFC 2000 shown. In FIG. 20B, a gas delivery system 2040 is shown. The MFC control circuit 280 of the MFC 2000 outputs the measured compressibility to an upstream flow control device 2050 and/or a downstream flow control device 2060. In FIG. 20C, a gas delivery system 2070 is shown. The MFC control circuit 280 of the MFC 2000 outputs the measured compressibility to a controller 2076 that controls an upstream temperature-based MFC 2072 and/or a downstream temperature-based MFC 2074. In FIG. 20D, a gas delivery system 2080 is shown. The MFC control circuit 280 of the MFC 2000 outputs the measured compressibility to a controller 2086 controlling an upstream pressure-based MFC 2082 and/or a downstream temperature-based MFC 2084.

Figure 21A:
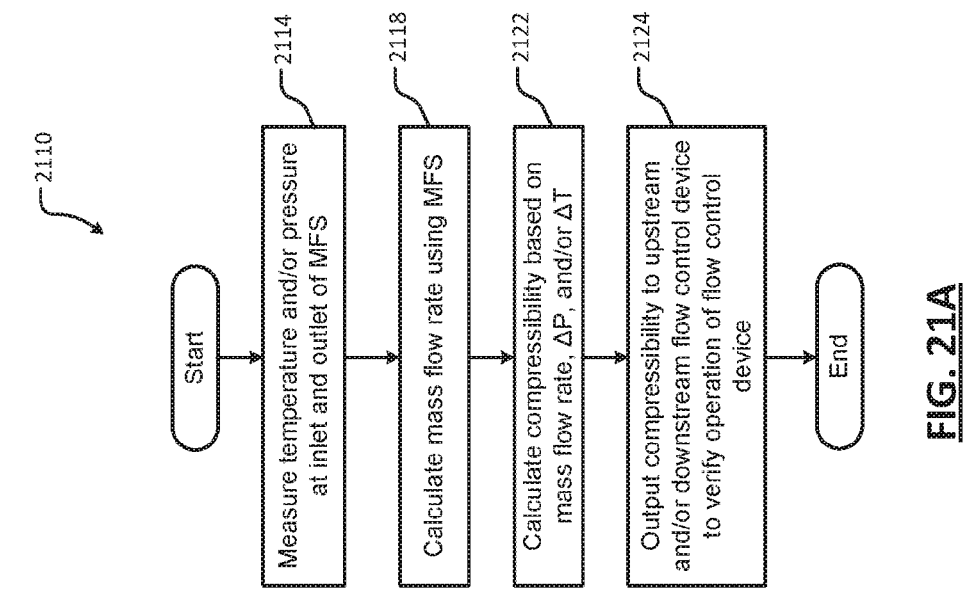
FIGS. 21A-21C are flowcharts of examples of methods for using compressibility to verify and/or adjust operation of an upstream or downstream flow control device, an upstream or downstream temperature-based MFC, and/or an upstream or downstream pressure-based MFC, respectively, according to the present disclosure.

Referring now to FIG. 21A, a method 2110 for using compressibility calculated by the MFC including the MEMS Coriolis flow sensor to verify and/or adjust operation of an upstream or downstream flow control device is shown. At 2114, temperature and/or pressure are measured at an inlet and an outlet of the MEMS Coriolis flow sensor. At 2118, mass flow rate is calculated using the MEMS Coriolis flow sensor. At 2122, compressibility is calculated based on $\Delta T$ and/or $\Delta P$. In some examples, the equation of state is used to calculate the compressibility based on $\Delta T$ and/or $\Delta P$. At 2124, the calculated compressibility is output to an upstream or downstream flow control device. The upstream or downstream flow control device uses the compressibility to verify operation of the flow control device and/or calibrate the flow control device.

Figure 21C:
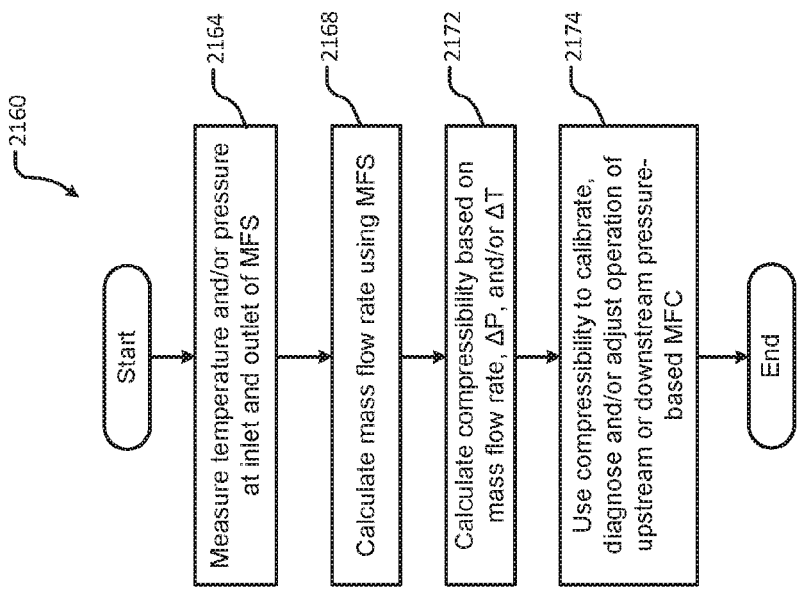
Figure 21B:
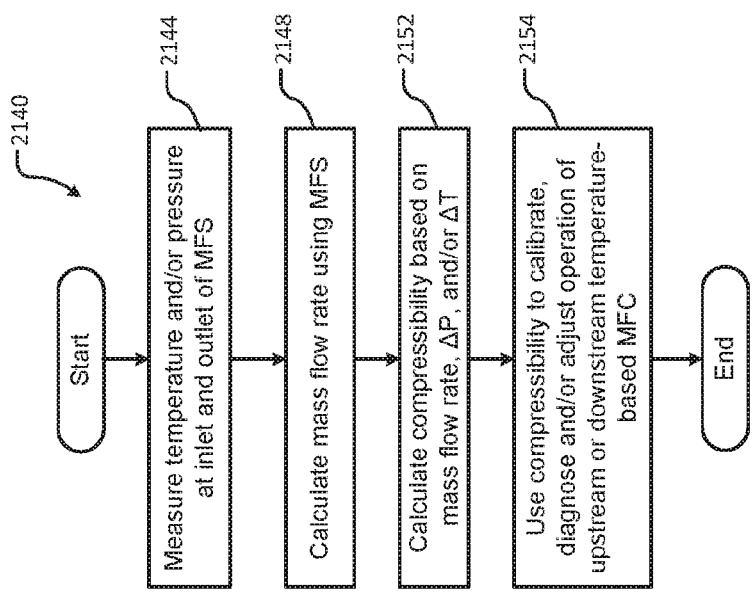

Referring now to FIG. 21B, a method 2140 for using compressibility calculated by an MFC including a MEMS Coriolis flow sensor to verify and/or adjust operation of an upstream or downstream flow control device is shown. At 2144, temperature and/or pressure are measured at an inlet and an outlet of the MEMS Coriolis flow sensor. At 2148, mass flow rate is calculated using the MEMS Coriolis flow sensor. At 2152, compressibility is calculated based on the $\Delta T$ and/or $\Delta P$. In some examples, the equation of state is used to calculate the compressibility based on $\Delta T$ and/or $\Delta P$. At 2154, the calculated compressibility is output to an upstream or downstream temperature-based MFC. The upstream or downstream temperature-based MFC uses the compressibility to calibrate, diagnose and/or adjust operation of the upstream or downstream temperature-based MFC.

Referring now to FIG. 21C, a method 2160 for using compressibility calculated by an MFC including a MEMS Coriolis flow sensor to verify and/or adjust operation of an upstream or downstream flow control device is shown. At 2164, temperature and/or pressure are measured at an inlet and an outlet of the MEMS Coriolis flow sensor. At 2168, mass flow rate is calculated using the MEMS Coriolis flow sensor. At 2172, compressibility is calculated based on $\Delta T$ and/or $\Delta P$. In some examples, the equation of state is used to calculate the compressibility based on $\Delta T$ and/or $\Delta P$. At 2174, the calculated compressibility is output to an upstream or downstream pressure-based MFC. The upstream or downstream pressure-based MFC uses the compressibility to calibrate, diagnose and/or adjust operation of the upstream or downstream pressure-based MFC.

Figure 22:
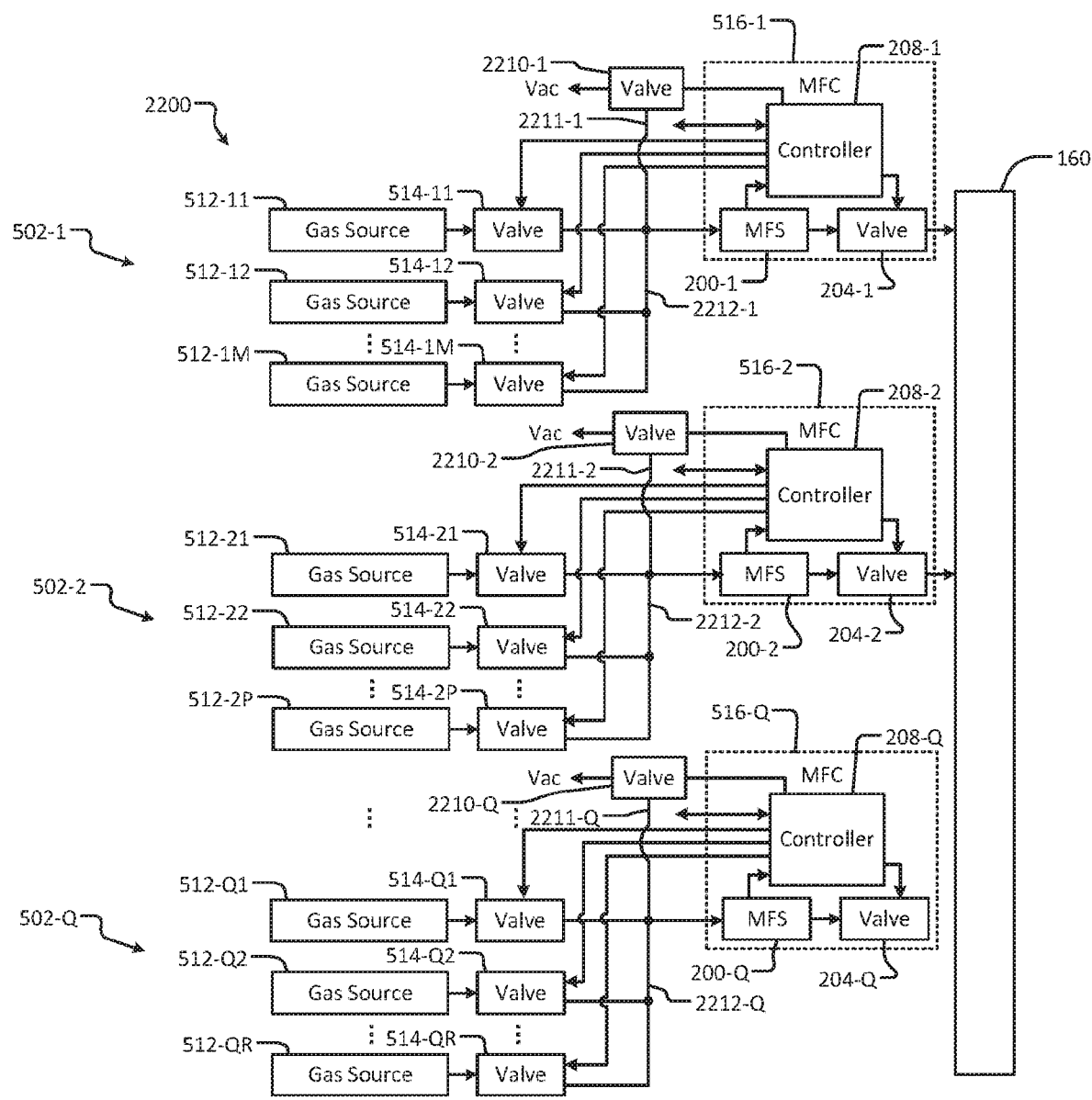
FIG. 22 is a functional block diagram of an example of multiplexed MFCs including a MEMS Coriolis flow sensor and a system for clearing residual gases in a gas flow channel between valves according to the present disclosure.

Referring now to FIG. 22, a gas delivery system 2200 including multiplexed mass flow sensor (MFS) with MEMS Coriolis flow sensors is shown. The gas delivery system 2200 further includes valves 2210-1, 2210-2, . . . and 2210-Q (collectively valves 2210) and gas flow channels 2211-1, 2211-2, . . . and 2211-Q (collectively gas flow channels 2211). The valves 2210 and the gas flow channels 2211 selectively connect flow paths 2212-1, 2212-2, . . . and 2212-Q (collectively gas flow channels 2212) to a vacuum source and/or another exhaust system. The valves 2210 and the gas flow channels 2211 evacuate the gas flow channels 2212-1, 2212-2, . . . and 2212-Q between the valves 514 and 204. Since multiple gases are supplied by each of the multiplexed MFCs during operation, evacuation of the gas flow channels 2212 removes residual gases between steps and tends to reduce defects. In other examples, the gas flow channels 2212 are also evacuated when the same gas is used but may be stale.

In some examples, the substrate processing system performs atomic layer deposition (ALD) or atomic layer etching (ALE) including multiple cycles each including exposing the substrate to a first gas mixture, purging the processing chamber, exposing the substrate to a second gas mixture, and purging the processing chamber. Plasma may be used during the steps. In some examples, the gas flow channels 2212 are excavated between the first gas mixture and the second gas mixture. In some examples, the ALD or ALE cycles and/or sub-cycles are relatively short (e.g. less the 10 s, 5 s, 2 s, 1 s).

Figure 23:
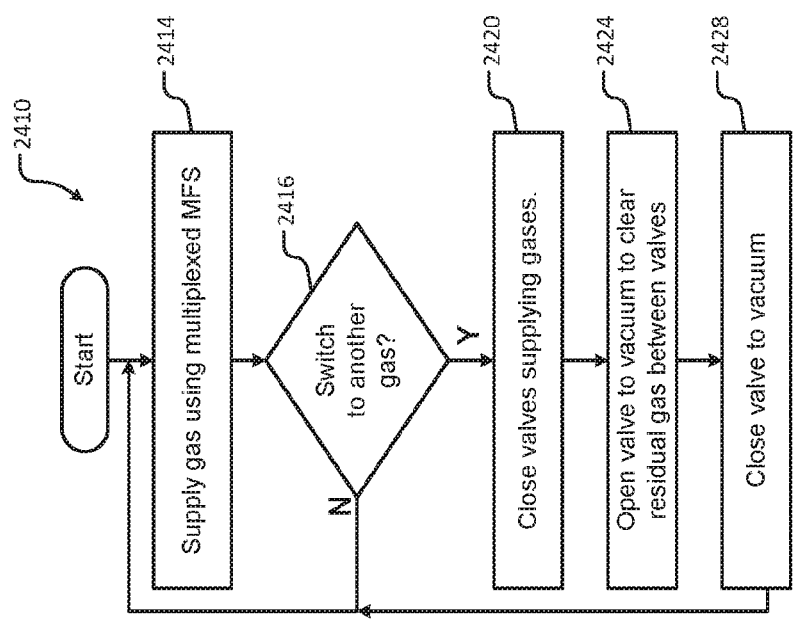
FIG. 23 is a flowchart of an example of a method for operating the system of FIG. 22 to clear residual gases between valves according to the present disclosure.

Referring now to FIG. 23, a method 2410 for operating the system of FIG. 22 to clear residual gases between valves 514 and 204 is shown. At 2414, gas is supplied using the multiplexed MFS. At 2416, the method determines whether the gas source will be switched to another type of gas. At 2420, the valves (one of the valves 514 and one of the valves 204) supplying the gas are closed. At 2424, the valve is open to the vacuum line (or exhaust) to clear residual gas between the valves 514 and 204. At 2428, the valve to vacuum (or exhaust) is closed. The method returns to 2414 and the next gas is supplied. As can be appreciated, the valves can also be used to clear stale gases when the gas source is not changed.

Figure 24:
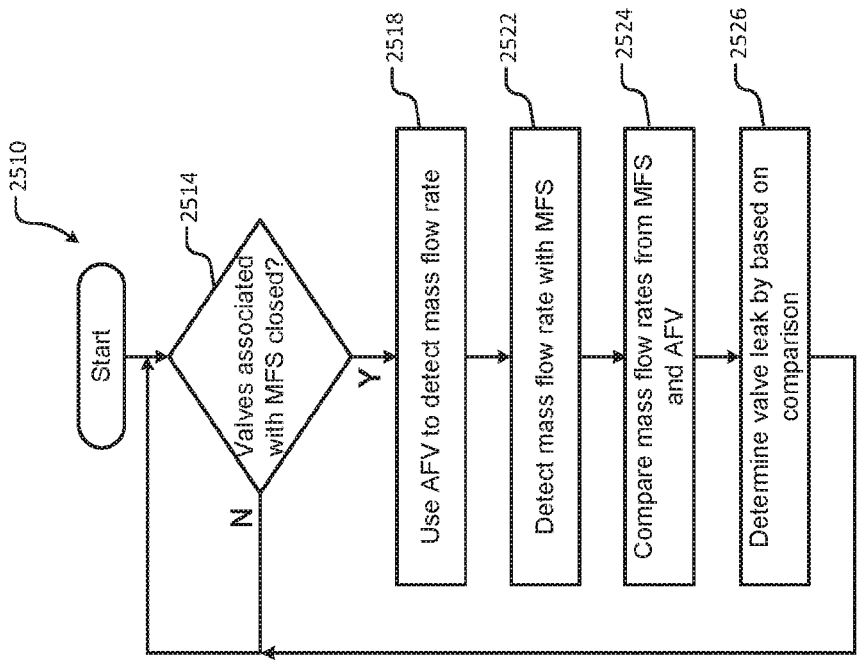
FIG. 24 is a flowchart of an example of a method for using AFV to detect valve leakage or drift according to the present disclosure.

Referring now to FIG. 24, a method 2510 for using AFV to detect valve leakage (flow of gases occurring when the valve is closed) is shown. At 2514, valves associated with the MFSs are closed. At 2518, AFV is used to detect the mass flow rate while the valves are closed. At this time, gas should not be supplied through the MFS and the mass flow rate should be equal to zero. If the AFV detects a nonzero mass flow rate, the valve may be leaking. At 2522, the mass flow rate is optionally detected with the MFS. At 2524, the mass flow rates detected by the MFS and AFV are optionally compared. At 2526, the valve leakage and/or other diagnostic decisions can be made based upon the AFV measurement, the MFS measurement and/or the comparison between the two measurements. For example, if both the MFS and the AFV detect zero mass flow rate, the MFS is operating correctly. For example, if both of the MFS and AFV detect similar non-zero mass flow rates (i.e. within a predetermined tolerance), the MFS may be operating correctly and one of the valves may have leakage. For example, if both of the MFS and AFV detect different non-zero mass flow rates (i.e. outside of the predetermined tolerance), the MFS may be operating incorrectly and/or one of the valves may be leaking.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In some implementations, a controller is part of a system, which may be part of the above-described examples. Such systems can comprise semiconductor processing equipment, including a processing tool or tools, chamber or chambers, a platform or platforms for processing, and/or specific processing components (a wafer pedestal, a gas flow system, etc.). These systems may be integrated with electronics for controlling their operation before, during, and after processing of a semiconductor wafer or substrate. The electronics may be referred to as the "controller," which may control various components or subparts of the system or systems. The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, wafer transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor wafer or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with the system, coupled to the system, otherwise networked to the system, or a combination thereof. For example, the controller may be in the "cloud" or all or a part of a fab host computer system, which can allow for remote access of the wafer processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process. In some examples, a remote computer (e.g. a server) can provide process recipes to a system over a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the processing chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

What is claimed is:

1. A fluid delivery system comprising:
   N first valves, wherein inlets of the N first valves are fluidly connected to N gas sources, respectively, where N is an integer greater than zero; and
   N mass flow controllers, each comprising:
      a microelectromechanical (MEMS) Coriolis flow sensor having an inlet in fluid communication with an outlet of a corresponding one of the N first valves;
      a second valve having an inlet in fluid communication with an outlet of the MEMS Coriolis flow sensor and an outlet supplying fluid to treat a substrate arranged in a processing chamber; and
      a controller in communication with the MEMS Coriolis flow sensor and configured to determine at least one of a mass flow rate and a density of fluid flowing through the MEMS Coriolis flow sensor,
   wherein the MEMS Coriolis flow sensor of at least one of the N mass flow controllers further includes an accelerometer.

2. The fluid delivery system of claim 1 further comprising:
   a manifold in fluid communication with the outlets of the second valves of the N mass flow controllers, respectively, wherein the processing chamber is in fluid communication with an outlet of the manifold.

3. The fluid delivery system of claim 1, wherein at least one of the N mass flow controllers further comprises:
   a precision orifice including an inlet fluidly connected to the outlet of the second valve; and
   a pressure sensor to sense pressure between the outlet of the second valve and the inlet of the precision orifice.

4. The fluid delivery system of claim 3, wherein the controller of the at least one of the N mass flow controllers is configured to perform flow verification based on the pressure sensed by the pressure sensor of the at least one of the N mass flow controllers.

5. The fluid delivery system of claim 3, wherein the controller of the at least one of the N mass flow controllers includes a lookup table that outputs a verified mass flow rate and that is indexed by the pressure.

6. The fluid delivery system of claim 1, wherein M of the MEMS Coriolis flow sensor are arranged on a single integrated circuit, where M is an integer that is greater than one and less than or equal to N.

7. The fluid delivery system of claim 1, wherein:
   the MEMS Coriolis flow sensor includes the tube though which the fluid flows,
   the MEMS Coriolis flow sensor vibrates the tube at a resonant frequency during measurement, and
   the tube is made of semiconductor material.

8. The fluid delivery system of claim 7, wherein:
   the tube has an inner diameter in a range from 10 μm to 100 μm; and
   the MEMS Coriolis flow sensor measures mass flow rates that are less than 1000 sccm.

9. The fluid delivery system of claim 8, wherein the MEMS Coriolis flow sensor measures mass flow rates that are less than 100 sccm.

10. The fluid delivery system of claim 8, wherein the MEMS Coriolis flow sensor measures mass flow rates that are less than 10 sccm.

11. The fluid delivery system of claim 7, wherein the MEMS Coriolis flow sensor includes a control circuit including:
    an actuator circuit configured to vibrate the tube at the resonant frequency;
    a capacitive sensing circuit configured to generate a signal in response to vibration of the tube; and
    a readout circuit configured to receive the signal.

12. The fluid delivery system of claim 1, wherein:
the accelerometer is configured to measure vibration of the MEMS Coriolis flow sensor, and
the controller of the at least one of the N mass flow controllers is configured to generate an error notification when the vibration of the MEMS Coriolis flow sensor of the at least one of the N mass flow controllers is greater than a predetermined vibration threshold.

13. The fluid delivery system of claim 1, wherein the controller of the at least one of the N mass flow controllers is configured detect a state of the MEMS Coriolis flow sensor of the at least one of the N mass flow controllers based on an output of the accelerometer.

14. The fluid delivery system of claim 13, wherein the controller of the at least one of the N mass flow controllers is configured to select one of a plurality of calibrations for the at least one of the N mass flow controllers based on the detected state.

15. A substrate processing system comprising:
the fluid delivery system of claim 1;
the processing chamber; and
a substrate support arranged in the processing chamber to support the substrate,
wherein the fluid delivery system delivers fluid to the processing chamber, and wherein the substrate processing system performs etching.

16. A substrate processing system comprising:
the fluid delivery system of claim 1;
the processing chamber; and
a substrate support arranged in the processing chamber to support the substrate,
wherein the fluid delivery system delivers fluid to the processing chamber, and wherein the substrate processing system performs deposition.

17. The fluid delivery system of claim 1 wherein the controller is configured to determine at least one of the mass flow rate and the density of the fluid flowing through a tube coupled to the inlet and the outlet of the MEMS Coriolis flow sensor based on a first signal received from the MEMS Coriolis flow sensor including an oscillation frequency of the tube and a second signal received from the MEMS Coriolis flow sensor including a phase shift measurement of the tube, respectively.

* * * * *